United States Patent
Xu et al.

(10) Patent No.: US 12,438,753 B2
(45) Date of Patent: Oct. 7, 2025

(54) DATA INTERFACE EQUALIZATION ADJUSTMENT METHOD AND APPARATUS, DEVICE, AND STORAGE MEDIUM

(71) Applicant: HUAWEI TECHNOLOGIES CO., LTD., Guangdong (CN)

(72) Inventors: Shibin Xu, Dongguan (CN); Kejian Wang, Shenzhen (CN); Fei Luo, Chengdu (CN); Jiankang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 18/521,508

(22) Filed: Nov. 28, 2023

(65) Prior Publication Data

US 2024/0097947 A1    Mar. 21, 2024

Related U.S. Application Data

(63) Continuation of application No. PCT/CN2022/090998, filed on May 5, 2022.

(30) Foreign Application Priority Data

May 31, 2021    (CN) .......................... 202110600896.7

(51) Int. Cl.
*H04L 25/03*  (2006.01)
*H04L 1/00*  (2006.01)

(52) U.S. Cl.
CPC ...... *H04L 25/03343* (2013.01); *H04L 1/0023* (2013.01); *H04L 1/0033* (2013.01)

(58) Field of Classification Search
CPC   H04L 25/03343; H04L 1/0023; H04L 1/0033
See application file for complete search history.

(56) References Cited

U.S. PATENT DOCUMENTS 10,644,907 B1   5/2020  Butcher et al.
2005/0276261 A1* 12/2005 Kim ...................... H04L 5/1438
                                                                 370/389

(Continued)

FOREIGN PATENT DOCUMENTS

| JP | 2008146457 A | 6/2008 |
| JP | 2012080559 A | 4/2012 |
| WO | 2020055792 A1 | 3/2020 |

OTHER PUBLICATIONS

Mipi alliance. Errata 01 for MIPI M-PHY Specification Version 4.1. Dec. 1, 2016. total 223 pages.

(Continued)

*Primary Examiner* — Janice N Tieu

(57) ABSTRACT

Embodiments of this application disclose a data interface equalization adjustment method and apparatus, a device, and a storage medium, and relate to the field of data interface technologies. The method includes: A second device determines equalization parameter indication information of a first transmitter TX on a first data interface. The second device sends a first equalization training sequence block ETSB to a corresponding RX on the first data interface through a TX on a second data interface, where the first ETSB carries the equalization parameter indication information and equalization target indication information, and the equalization target indication information indicates that the first TX is an equalization target. The first device determines the equalization target to be the first TX based on the equalization target indication information, and adjusts an equalization parameter of the first TX to an equalization parameter indicated by the equalization parameter indication information.

20 Claims, 17 Drawing Sheets

(56) References Cited

U.S. PATENT DOCUMENTS

| | | | |
|---|---|---|---|
| 2016/0164703 A1* | 6/2016 | Stone | ............... H04L 25/03343 |
| | | | 398/140 |
| 2019/0044763 A1 | 2/2019 | Shah et al. | |
| 2020/0212943 A1* | 7/2020 | Banin | ................. H04L 25/4902 |
| 2020/0412586 A1 | 12/2020 | Mcloughlin | |
| 2022/0231890 A1* | 7/2022 | Horn | ................. H04L 25/03343 |
| 2022/0247603 A1* | 8/2022 | Razavi Majomard | . H04B 3/238 |

OTHER PUBLICATIONS

PCI Express Base Specification Revision 5.0Version 1.0. May 22, 2019. total 1299 pages.

* cited by examiner

DATA INTERFACE EQUALIZATION ADJUSTMENT METHOD AND APPARATUS, DEVICE, AND STORAGE MEDIUM

CROSS-REFERENCE TO RELATED APPLICATIONS

This application is a continuation of International Application No. PCT/CN2022/090998, filed on May 5, 2022, which claims priority to Chinese Patent Application No. 202110600896.7, filed on May 31, 2021. The disclosures of the aforementioned applications are hereby incorporated by reference in their entireties.

TECHNICAL FIELD

This application relates to the field of data interface technologies, and in particular, to a data interface equalization adjustment method and apparatus, a device, and a storage medium.

BACKGROUND

Continuous improvement of computing performance of computing devices poses a corresponding higher requirement on a data transmission rate between the computing devices. Currently, a serial high-speed bus is usually used as a communication bus between the computer devices. To ensure accuracy of high-rate data communication, equalization training needs to be performed on a data interface, to adjust equalization parameters of a transmitter (TX) and a receiver (RX) on the data interface.

Currently, common standard protocols for serial high-speed buses are PCIE, ETH, FC, and the like. In these standard protocols, a first data interface and a second data interface for data transmission need to include same quantities of TXs and RXs. One TX on the first data interface corresponds to one RX on the second data interface, and the TX and the RX form a data transmission line whose data transmission direction is TX to RX. Two lines having opposite data transmission directions form a lane. One line belongs to only one lane. In an equalization parameter adjustment method provided in these standard protocols, for each lane, equalization parameters of the TX and the RX in the lane are separately adjusted.

For a lane, the lane includes a first TX and a second RX on a first data interface, and includes a first RX and a second TX on a second data interface. The first TX and the first RX belong to a same data transmission link, and the second RX and the second TX belong to another same data transmission line. A device to which the first data interface belongs determines an equalization parameter of the second TX. The first TX includes the determined equalization parameter in an equalization training sequence block (ETSB), and sends the ETSB to the first RX. After the first RX receives the ETSB, a device to which the second data interface belongs adjusts an equalization parameter of the second TX to the equalization parameter carried in the ETSB.

In a process of implementing this application, an inventor finds that related technologies have at least the following problems:

In the equalization parameter adjustment method, equalization parameters of a TX and an RX in each lane need to be separately adjusted. This can be implemented only in a scenario in which quantities of TXs and RXs on a data interface are the same. However, in some scenarios, quantities of TXs and RXs on a data interface are different, and therefore the equalization parameter adjustment method is no longer applicable. It can be learned that the equalization parameter adjustment method is not universal.

SUMMARY

Embodiments of this application provide a data interface equalization adjustment method and apparatus, a device, and a storage medium, to implement equalization adjustment on a data interface having different quantities of TXs and RXs. Technical solutions are as follows.

According to a first aspect, a data interface equalization adjustment method is provided. The method is applied to a communication system. The communication system includes a first device and a second device. The first device includes a first data interface. The second device includes a second data interface. The first data interface and the second data interface are connected over a link. The method includes:

The second device determines equalization parameter indication information of a first transmitter TX on the first data interface. The second device sends a first equalization training sequence block ETSB to a corresponding RX on the first data interface through a TX on the second data interface, where the first ETSB carries the equalization parameter indication information and equalization target indication information, and the equalization target indication information indicates that the first TX is an equalization target. The first device determines the equalization target to be the first TX based on the equalization target indication information, and adjusts an equalization parameter of the first TX to an equalization parameter indicated by the equalization parameter indication information.

In a solution shown in this application, when detecting that a transmission rate of the second data interface changes, the second device may determine a to-be-used equalization parameter for each TX on the first data interface according to a preset sequence. The second device may store identifiers of TXs on the second data interface, and the second device determines an equalization parameter of each TX on the second data interface according to a storage sequence of the identifiers of the TXs on the second data interface. After an equalization parameter of a TX is adjusted, a to-be-used equalization parameter of the TX is no longer determined, and a to-be-used equalization parameter of a next TX starts to be determined.

When sending the first ETSB carrying the equalization parameter indication information and the equalization target indication information to the first device, the second device may send the ETSB through any TX on the second data interface, or may send one first ETSB through each TX on the second data interface. After receiving the first ETSB, the first device does not determine, based on an RX receiving the first ETSB, of which TX an equalization parameter is to be adjusted, but determines, based on the equalization target indication information carried in the first ETSB, of which TX an equalization parameter needs to be adjusted this time. In this way, when quantities of RXs and TXs on the first data interface are different and the RXs and the TXs on the first data interface cannot be in a one-to-one correspondence, an equalization parameter of a specified TX can also be adjusted. This has better universal applicability.

In addition, the first device may adjust an equalization parameter of a TX on the second data interface of the second device according to the same method.

In an implementation, after receiving the first ETSB and adjusting the equalization parameter of the specified TX, the first device may send a target data stream to a corresponding RX on the second data interface through a TX on the first data interface. Correspondingly, the second device performs the determining equalization parameter indication information of a first TX on the first data interface, to continue to adjust the equalization parameter of the first TX, when determining, based on the target data stream, that a lane to which the first TX belongs does not meet a first data transmission condition. The first device stops adjusting the equalization parameter of the first TX until the lane to which the first TX belongs meets the first data transmission condition, and adjusts an equalization parameter of a next TX on the first data interface.

In the solution shown in this application, the target data stream may be an ETSB, pseudo random binary sequence (PRBS), or the like.

In an implementation, the first data transmission condition may be that a bit error rate of the lane is less than a first threshold. Correspondingly, processing in which the second device determines whether the lane to which the first TX belongs meets the first data transmission condition may be that the second device determines, based on the target data stream, a bit error rate of the lane to which the first TX belongs, and determines whether the bit error rate of the lane to which the first TX belongs is less than the first threshold. If the bit error rate of the lane to which the first TX belongs is less than the first threshold, it is considered that the lane to which the first TX belongs meets the first data transmission condition. If the bit error rate of the lane to which the first TX belongs is greater than the first threshold, it is considered that the lane to which the first TX belongs does not meet the first data transmission condition.

In an implementation, the second device determines the equalization parameter indication information of the first TX on the first data interface according to the following method:

The second device may store a first equalization parameter set. The first equalization parameter set includes a plurality of groups of equalization parameters. Each group of equalization parameters may include an equalization preset value, an equalization coefficient, and the like. When the second device 220 determines to-be-used equalization parameters for the first TX for the first time, the second device randomly selects a group of equalization parameters from the first equalization parameter set as the to-be-used equalization parameters for the first TX. When selecting to-be-used equalization parameters for the first TX next time, the second device selects the to-be-used equalization parameters for the first TX from an equalization parameter subset that is in the first equalization parameter set and that corresponds to the first TX. The equalization parameter subset corresponding to the first TX includes equalization parameters other than the selected to-be-used equalization parameters for the first TX in the first equalization parameter set.

After the to-be-used equalization parameters for the first TX are determined, equalization parameter indication information corresponding to the to-be-used equalization parameters for the first TX may be further determined. A method for determining corresponding equalization parameter indication information is: using a determined to-be-used equalization parameter of the first TX as the corresponding equalization parameter indication information, or multiplying the determined to-be-used equalization parameter of the first TX by a preset coefficient, to obtain the corresponding equalization parameter indication information.

In an implementation, the second device may send the first ETSB in a splitting manner. A method may be as follows:

The second device splits the first ETSB into a plurality of first data segments, where a quantity of first data segments obtained through splitting is the same as a quantity of TXs on the second data interface. The second device sends one first data segment in the plurality of first data segments to a corresponding RX on the first data interface through each TX on the second data interface according to an arrangement sequence of the TXs on the second data interface.

Correspondingly, a method for the first device to obtain the first ETSB may be as follows:

The first device concatenates, according to an arrangement sequence of RXs on the first data interface, the plurality of first data segments received, to obtain the first ETSB.

In an implementation, the second device may further perform, based on the target data stream returned by the first device, adaptive equalization adjustment on the RX receiving the target data stream, so that data transmission quality of the lane can meet a requirement more quickly.

In an implementation, before the method is performed, the RXs on the first data interface may be further pre-adjusted first. A pre-adjustment method may be as follows:

The second device sends a second ETSB to an RX on the first data interface through a TX on the second data interface. The first device obtains a to-be-used equalization parameter for each target RX receiving the second ETSB from a stored second equalization parameter set, and adjusts an equalization parameter of the target RX to the to-be-used equalization parameter of the target RX when determining that a lane to which the target RX belongs does not meet a second data transmission condition.

In an implementation, the second device may also send the second ETSB through splitting. Processing may be as follows:

The second device splits the second ETSB into a plurality of second data segments, where a quantity of second data segments obtained through splitting is the same as a quantity of the TXs on the second data interface. The second device sends one second data segment in the plurality of second data segments to a corresponding RX on the first data interface through each TX on the second data interface according to the arrangement sequence of the TXs on the second data interface.

In an implementation, if a lane to which a specific RX on the first data interface belongs does not meet the second data transmission condition, the equalization parameter of the RX is cyclically adjusted until the lane to which the RX belongs meets the second data transmission condition.

In an implementation, the second data transmission condition may be that a bit error rate of the lane is less than a second threshold. The second threshold may be set to be greater than the first threshold. Correspondingly, the first device determines a bit error rate of the lane to which the target RX belongs based on the second data segment received by the target RX, obtains the to-be-used equalization parameter of the target RX from the stored second equalization parameter set, and adjusts the equalization parameter of the target RX to the to-be-used equalization parameter of the target RX when determining the bit error rate of the lane to which the target RX belongs to be greater than the second threshold.

In an implementation, the equalization target indication information is an identifier of the lane to which the first TX belongs.

According to a second aspect, a data interface equalization adjustment method is provided. The method is applied to a communication system. The communication system includes a first device and a second device. The first device includes a first data interface. The second device includes a second data interface. The first data interface and the second data interface are connected over a link. The method includes:

The second device determines equalization parameter indication information to which TXs on the first data interface jointly correspond. The second device sends a first ETSB to an RX on the first data interface through a TX on the second data interface, where the first ETSB carries the equalization parameter indication information. The first device adjusts equalization parameters of the TXs on the first data interface to an equalization parameter indicated by the equalization parameter indication information.

In a solution shown in this application, when detecting that a transmission rate of the second data interface changes, the second device determines the equalization parameter indication information to which the TXs on the first data interface jointly correspond. After receiving the first ETSB carrying the equalization quantity indication information, the first device does not determine, based on an RX receiving the first ETSB, of which TX an equalization parameter is to be adjusted, but directly adjusts equalization parameters of all the TXs on the first data interface to the equalization parameter indicated by the equalization parameter indication information. In this way, when quantities of RXs and TXs on the first data interface are different and the RXs and the TXs on the first data interface cannot be in a one-to-one correspondence, the equalization parameters of the TXs on the first data interface can also be adjusted. This has better universal applicability.

In an implementation, after the first device adjusts equalization parameters of the TXs on the first data interface to an equalization parameter indicated by the equalization parameter indication information, the method further includes:

The first device sends a target data stream to RXs on the second data interface through the TXs on the first data interface. The second device performs that the second device determines first equalization parameter indication information to which TXs on the first data interface jointly correspond when determining, based on the target data stream, that there is a lane that is in lanes to which the RXs on the second data interface belong and that does not meet a first data transmission condition. That is, the equalization parameters of all the TXs on the first data interface are adjusted in a unified manner each time.

In an implementation, the first data transmission condition is that a bit error rate of the lane is less than a first threshold.

In an implementation, the second device sends the first ETSB according to the following method:

The second device splits the first ETSB into a plurality of first data segments, where a quantity of first data segments obtained through splitting is the same as a quantity of TXs on the second data interface. The second device sends one first data segment in the plurality of first data segments to a corresponding RX on the first data interface through each TX on the second data interface according to an arrangement sequence of the TXs on the second data interface.

Correspondingly, the first device concatenates, according to an arrangement sequence of RXs on the first data interface, the plurality of first data segments received, to obtain the first ETSB.

The second device may further perform, based on the target data stream returned by the first device, adaptive equalization adjustment on the RX receiving the target data stream, so that data transmission quality of the lane can meet a requirement more quickly.

In an implementation, before the method is performed, the RXs on the first data interface may be further pre-adjusted first. A pre-adjustment method may be as follows:

The second device sends a second ETSB to an RX on the first data interface through a TX on the second data interface. The first device obtains a to-be-used equalization parameter for each target RX receiving the second ETSB from a stored second equalization parameter set, and adjusts an equalization parameter of the target RX to the to-be-used equalization parameter of the target RX when determining that a lane to which the target RX belongs does not meet a second data transmission condition.

In an implementation, the second device may also send the second ETSB through splitting. Processing may be as follows:

The second device splits the second ETSB into a plurality of second data segments, where a quantity of second data segments obtained through splitting is the same as a quantity of the TXs on the second data interface. The second device sends one second data segment in the plurality of second data segments to a corresponding RX on the first data interface through each TX on the second data interface according to the arrangement sequence of the TXs on the second data interface.

In an implementation, if a lane to which a specific RX on the first data interface belongs does not meet the second data transmission condition, the equalization parameter of the RX is cyclically adjusted until the lane to which the RX belongs meets the second data transmission condition.

In an implementation, the second data transmission condition may be that a bit error rate of the lane is less than a second threshold. The second threshold may be set to be greater than the first threshold. Correspondingly, the first device determines a bit error rate of the lane to which the target RX belongs based on the second data segment received by the target RX, obtains the to-be-used equalization parameter of the target RX from the stored second equalization parameter set, and adjusts the equalization parameter of the target RX to the to-be-used equalization parameter of the target RX when determining the bit error rate of the lane to which the target RX belongs to be greater than the second threshold.

In an implementation, the equalization target indication information is an identifier of a lane to which a first TX belongs.

According to a third aspect, a data interface equalization adjustment method is provided. The method is applied to a communication system. The communication system includes a first device and a second device. The first device includes a first data interface. The second device includes a second data interface. The first data interface and the second data interface are connected over a link. The method includes:

The second device determines equalization parameter indication information of a first TX on the first data interface. The second device sends a first ETSB to a corresponding RX on the first data interface through a second TX on the second data interface, where the first ETSB carries the equalization parameter indication information. The first device adjusts an equalization parameter of the first TX to an equalization parameter indicated by the equalization parameter indication information. The first device configures equalization parameters of TXs on the first data interface to a current equalization parameter of the first TX when determining that a lane to which the first TX belongs meets a first data transmission condition.

In a solution shown in this application, when detecting that a transmission rate of the second data interface changes, the second device determines the equalization parameter indication information of the first TX on the first data interface of the first device. The first TX is a pre-specified TX. After receiving the first ETSB carrying the equalization parameter indication information, the first device does not determine, based on an RX receiving the first ETSB, of which TX an equalization parameter is to be adjusted, but adjust the equalization parameter of the pre-specified first TX. After the first TX is adjusted, the equalization parameter of the first TX is configured to all the TXs on the first data interface. In this way, when quantities of RXs and TXs on the first data interface are different and the RXs and the TXs on the first data interface cannot be in a one-to-one correspondence, an equalization parameter of a specified TX can also be adjusted. This has better universal applicability. In addition, only one lane is used when the ETSB is sent, and when the equalization parameters of the TXs are adjusted, only an equalization parameter of one TX is cyclically adjusted. In this way, power consumption of the device during equalization adjustment on the data interface can be effectively reduced.

In an implementation, after the first device adjusts the equalization parameters of the first TX to the equalization parameter indicated by the first equalization parameter indication information, the method further includes:

The first device sends a target data stream to a corresponding RX on the second data interface through the first TX. The second device sends an equalization completion message to the first device when determining, based on the target data stream, that the lane to which the first TX belongs meets the first data transmission condition. Correspondingly, the first device configures the equalization parameters of the TXs on the first data interface to the current equalization parameter of the first TX when the first device receives the equalization completion message.

In an implementation, if the lane to which the first TX belongs does not meet the first data transmission condition, the equalization parameter of the first TX is cyclically adjusted until the lane to which the first TX belongs meets the first data transmission condition.

In an implementation, the first data transmission condition may be that a bit error rate of the lane is less than a first threshold.

In an implementation, that the second device determines equalization parameter indication information of a first TX on the first data interface includes:

The second device obtains a to-be-used equalization parameter of the first TX from a stored first equalization parameter set. The second device determines the equalization parameter indication information corresponding to the to-be-used equalization parameter of the first TX.

In an implementation, the second device may further perform, based on the target data stream returned by the first device, adaptive equalization adjustment on the RX receiving the target data stream, so that data transmission quality of the lane can meet a requirement more quickly.

In an implementation, before the method is performed, RXs on the first data interface may be further pre-adjusted first. A pre-adjustment method may be as follows:

The second device sends a second ETSB to an RX on the first data interface through a TX on the second data interface. The first device obtains a to-be-used equalization parameter for each target RX receiving the second ETSB from a stored second equalization parameter set, and adjusts an equalization parameter of the target RX to the to-be-used equalization parameter of the target RX when determining that a lane to which the target RX belongs does not meet a second data transmission condition.

In an implementation, the second device may also send the second ETSB through splitting. Processing may be as follows:

The second device splits the second ETSB into a plurality of second data segments, where a quantity of second data segments obtained through splitting is the same as a quantity of the TXs on the second data interface. The second device sends one second data segment in the plurality of second data segments to a corresponding RX on the first data interface through each TX on the second data interface according to an arrangement sequence of the TXs on the second data interface.

In an implementation, if a lane to which a specific RX on the first data interface belongs does not meet the second data transmission condition, the equalization parameter of the RX is cyclically adjusted until the lane to which the RX belongs meets the second data transmission condition.

In an implementation, the second data transmission condition may be that a bit error rate of the lane is less than a second threshold. The second threshold may be set to be greater than the first threshold. Correspondingly, the first device determines a bit error rate of the lane to which the target RX belongs based on the second data segment received by the target RX, obtains the to-be-used equalization parameter of the target RX from the stored second equalization parameter set, and adjusts the equalization parameter of the target RX to the to-be-used equalization parameter of the target RX when determining the bit error rate of the lane to which the target RX belongs to be greater than the second threshold.

In an implementation, the equalization target indication information is an identifier of the lane to which the first TX belongs.

According to a fourth aspect, a data interface equalization adjustment method is provided. The method includes:
  determining equalization parameter indication information of a first TX on a first data interface of a first device; and
  sending a first ETSB to a corresponding RX on the first data interface through a TX on a second data interface. The first ETSB carries the equalization parameter indication information and equalization target indication information. The equalization target indication information indicates that the first TX is an equalization target. The equalization parameter indication information indicates the first device to adjust an equalization parameter of the first TX to an equalization parameter indicated by the equalization parameter indication information.

In an implementation, the method further includes:
  receiving a target data stream sent by the first device through a TX on the first data interface; and
  performing the determining equalization parameter indication information of a first TX on a first data interface of a first device when determining, based on the target data stream, that a lane to which the first TX belongs does not meet a first data transmission condition.

In an implementation, the performing the determining equalization parameter indication information of a first TX on a first data interface of a first device when determining, based on the target data stream, that a lane to which the first TX belongs does not meet a first data transmission condition includes:
    determining, based on the target data stream, a bit error rate of the lane to which the first TX belongs, and performing that the second device determines first equalization parameter indication information of a first TX on a first data interface when determining that the bit error rate of the lane to which the first TX belongs is greater than a first threshold.

In an implementation, the determining equalization parameter indication information of a first TX on a first data interface includes:
    obtaining a to-be-used equalization parameter of the first TX from a stored first equalization parameter set; and
    determining the equalization parameter indication information corresponding to the to-be-used equalization parameter of the first TX.

In an implementation, the sending a first ETSB to a corresponding RX on the first data interface through a TX on a second data interface includes:
    splitting the first ETSB into a plurality of first data segments, where a quantity of first data segments obtained through splitting is the same as a quantity of TXs on the second data interface; and
    sending one first data segment in the plurality of first data segments to a corresponding RX on the first data interface through each TX on the second data interface according to an arrangement sequence of the TXs on the second data interface.

In an implementation, after the receiving a target data stream sent by the first device through a TX on the first data interface, the method further includes:
    performing, based on the target data stream, adaptive equalization adjustment on the RX receiving the target data stream.

In an implementation, the method further includes:
    sending a second ETSB to an RX on the first data interface through a TX on the second data interface. The second ETSB indicates the first device to obtain a to-be-used equalization parameter for each target RX receiving the second ETSB from a stored second equalization parameter set, and adjust an equalization parameter of the target RX to the to-be-used equalization parameter of the target RX when determining that a lane to which the target RX belongs does not meet a second data transmission condition.

In an implementation, the equalization target indication information is an identifier of the lane to which the first TX belongs.

According to a fifth aspect, a data interface equalization adjustment method is provided. The method includes:
    receiving a first ETSB sent by a second device through a TX on a second data interface, where the first ETSB carries equalization parameter indication information and equalization target indication information; and
    determining an equalization target to be the first TX based on the equalization target indication information, and adjusting an equalization parameter of the first TX to an equalization parameter indicated by the equalization parameter indication information.

In an implementation, after the determining an equalization target to be the first TX based on the equalization target indication information, and adjusting an equalization parameter of the first TX to an equalization parameter indicated by the equalization parameter indication information, the method further includes:
    sending a target data stream to a corresponding RX on the second data interface through a TX on the first data interface.

In an implementation, the method further includes:
    receiving a second ETSB sent by the second device through a TX on the second data interface; and
    obtaining a to-be-used equalization parameter for each target RX receiving the second ETSB from a stored second equalization parameter set, and adjusting an equalization parameter of the target RX to the to-be-used equalization parameter of the target RX when determining that a lane to which the target RX belongs does not meet a second data transmission condition.

In an implementation, the equalization target indication information is an identifier of a lane to which the first TX belongs.

According to a sixth aspect, a data interface equalization adjustment method is provided. The method includes:
    determining equalization parameter indication information to which TXs on a first data interface of a first device jointly correspond; and
    sending a first ETSB to an RX on the first data interface through a TX on a second data interface. The first ETSB carries the equalization parameter indication information. The equalization parameter indication information indicates the first device to adjust equalization parameters of the TXs on the first data interface to an equalization parameter indicated by the equalization parameter indication information.

In an implementation, the method further includes:
    receiving a target data stream sent by the first device through a TX on the first data interface; and
    performing the determining equalization parameter indication information to which TXs on a first data interface of a first device jointly correspond when determining, based on the target data stream, that there is a lane that is in lanes to which RXs on the second data interface belong and that does not meet a first data transmission condition.

In an implementation, the performing the determining equalization parameter indication information to which TXs on a first data interface of a first device jointly correspond when determining, based on the target data stream, that there is a lane that is in lanes to which RXs on the second data interface belong and that does not meet a first data transmission condition includes:
    determining, based on the target data stream, bit error rates of the lanes to which the RXs on the second data interface belong, and performing that the second device determines first equalization parameter indication information to which TXs on a first data interface jointly correspond when there is a bit error rate that is in the bit error rates of the lanes to which the RXs belong and that is greater than a first threshold.

In an implementation, the determining equalization parameter indication information to which TXs on a first data interface of a first device jointly correspond includes:
    obtaining a to-be-used equalization parameter to which the TXs on the first data interface of the first device jointly correspond from a stored first equalization parameter set; and
    determining the equalization parameter indication information corresponding to the to-be-used equalization parameter.

In an implementation, the sending a first ETSB to a corresponding RX on the first data interface through a TX on the second data interface includes:

splitting the first ETSB into a plurality of first data segments, where a quantity of first data segments obtained through splitting is the same as a quantity of TXs on the second data interface; and the second device sends one first data segment in the plurality of first data segments to a corresponding RX on the first data interface through each TX on the second data interface according to an arrangement sequence of the TXs on the second data interface.

In an implementation, after the receiving a target data stream sent by the first device through a TX on the first data interface, the method further includes:

performing, based on the target data stream, adaptive equalization adjustment on the RX receiving the target data stream.

In an implementation, the method further includes:

sending a second ETSB to an RX on the first data interface through a TX on the second data interface. The second ETSB indicates the first device to obtain a to-be-used equalization parameter for each target RX receiving the second ETSB from a stored second equalization parameter set, and adjust an equalization parameter of the target RX to the to-be-used equalization parameter of the target RX when determining that a lane to which the target RX belongs does not meet a second data transmission condition.

In an implementation, equalization target indication information is an identifier of a lane to which a first TX belongs.

According to a seventh aspect, a data interface equalization adjustment method is provided. The method includes:

receiving a first ETSB sent by a second device through a TX on a second data interface, where the first ETSB carries equalization parameter indication information; and adjusting equalization parameters of TXs on a first data interface to an equalization parameter indicated by the equalization parameter indication information.

In an implementation, after the adjusting equalization parameters of TXs on a first data interface to an equalization parameter indicated by the equalization parameter indication information, the method further includes:

sending a target data stream to a corresponding RX on the second data interface through a TX on the first data interface.

In an implementation, the method further includes:

receiving a second ETSB sent by the second device through a TX on the second data interface; and obtaining a to-be-used equalization parameter for each target RX receiving the second ETSB from a stored second equalization parameter set, and adjusting an equalization parameter of the target RX to the to-be-used equalization parameter of the target RX when determining that a lane to which the target RX belongs does not meet a second data transmission condition.

In an implementation, equalization target indication information is an identifier of the lane to which a first TX belongs.

According to an eighth aspect, a data interface equalization method is provided. The method includes:

determining equalization parameter indication information of a first TX on a first data interface of a first device; and sending a first ETSB to a corresponding RX on the first data interface through a second TX on a second data interface. The first ETSB carries the equalization parameter indication information. The equalization parameter indication information indicates the first device to adjust an equalization parameter of the first TX to an equalization parameter indicated by the equalization parameter indication information, and to configure equalization parameters of TXs on the first data interface to a current equalization parameter of the first TX when determining that a lane to which the first TX belongs meets a first data transmission condition.

In an implementation, the method further includes:

receiving a target data stream sent by the first device to a corresponding RX on the second data interface through the first TX; and sending an equalization completion message to the first device when determining, based on the target data stream, that the lane to which the first TX belongs meets the first data transmission condition.

In an implementation, the method further includes:

performing that a second device determines equalization parameter indication information of a first TX on a first data interface when determining, based on the target data stream, that the lane to which the first TX belongs does not meet the first data transmission condition.

In an implementation, the sending an equalization completion message to the first device when determining, based on the target data stream, that the lane to which the first TX belongs meets the first data transmission condition includes:

determining, based on the target data stream, a bit error rate of the lane to which the first TX belongs, and sending the equalization completion message to the first device when determining that the bit error rate of the lane to which the first TX belongs is less than a first threshold.

The performing that a second device determines equalization parameter indication information of a first TX on a first data interface when determining, based on the target data stream, that the lane to which the first TX belongs does not meet the first data transmission condition includes:

determining, based on the target data stream, a bit error rate of the lane to which the first TX belongs, and performing the determining, by a second device, equalization parameter indication information of a first TX on a first data interface when determining that the bit error rate of the lane to which the first TX belongs is greater than the first threshold.

In an implementation, the determining equalization parameter indication information of a first TX on a first data interface includes:

obtaining a to-be-used equalization parameter of the first TX from a stored first equalization parameter set; and determining the equalization parameter indication information corresponding to the to-be-used equalization parameter of the first TX.

In an implementation, after the sending a target data stream to an RX on the second data interface through a TX on the first data interface, the method further includes:

performing, based on the target data stream, adaptive equalization adjustment on the RX receiving the target data stream.

In an implementation, the method further includes:

sending a second ETSB to an RX on the first data interface through a TX on the second data interface. The second ETSB indicates the first device to obtain a to-be-used equalization parameter for each target RX receiving the second ETSB from a stored second equalization parameter set, and adjust an equalization parameter of the target RX to the to-be-used equalization parameter of the target RX when determining that a lane to which the target RX belongs does not meet a second data transmission condition.

In an implementation, equalization target indication information is an identifier of the lane to which the first TX belongs.

According to a ninth aspect, a data interface equalization adjustment method is provided. The method includes:

receiving a first ETSB sent by a second device through a second TX on a second data interface, where the first ETSB carries equalization parameter indication information;

adjusting an equalization parameter of a first TX to an equalization parameter indicated by the equalization parameter indication information; and configuring equalization parameters of TXs on a first data interface to a current equalization parameter of the first TX when determining that a lane to which the first TX belongs meets a first data transmission condition.

In an implementation, the method further includes:
sending a target data stream to a corresponding RX on the second data interface through the first TX.

In an implementation, the method further includes:
receiving a second ETSB sent by the second device through a TX on the second data interface; and
obtaining a to-be-used equalization parameter for each target RX receiving the second ETSB from a stored second equalization parameter set, and adjusting an equalization parameter of the target RX to the to-be-used equalization parameter of the target RX when determining that a lane to which the target RX belongs does not meet a second data transmission condition.

In an implementation, equalization target indication information is an identifier of the lane to which the first TX belongs.

According to a tenth aspect, a data interface equalization adjustment apparatus is provided. The apparatus is configured to perform the method according to any one of the fourth aspect to the ninth aspect. The apparatus includes a module configured to perform the method according to any one of the fourth aspect to the ninth aspect.

According to an eleventh aspect, a device is provided. The device includes a processor and a memory.

The memory stores instructions, and the processor executes the instructions to implement the data interface equalization adjustment method according to any one of the fourth aspect to the ninth aspect.

According to twelfth aspect, a computer-readable storage medium is provided. The computer-readable storage medium stores instructions, and the instructions are loaded and executed by a processor, to implement the data interface equalization adjustment method according to any one of the fourth aspect to the ninth aspect.

According to a thirteenth aspect, a computer program product is provided. The computer program product includes instructions, and the instructions are loaded and executed by a processor, to implement the data interface equalization adjustment method according to any one of the fourth aspect to the ninth aspect.

According to a fourteenth aspect, a chip system is provided. The chip system includes at least one processor, configured to support implementation of functions according to any one of the first aspect and implementations of the first aspect, for example, receiving or processing an ETSB and a data stream in the method.

In an design, the chip system further includes a memory. The memory is configured to store program instructions and data. The memory is located inside the processor or outside the processor. The chip system may include a chip, or may include a chip and another discrete component.

The technical solutions provided in embodiments of this application bring the following beneficial effect.

A second device includes, in a first ETSB, equalization parameter indication information and equalization target indication information that correspond to a first TX, and sends the first ETSB to a first device. After receiving the first ETSB, the first device does not determine, based on an RX receiving the first ETSB, of which TX an equalization parameter is to be adjusted, but determines, based on the equalization target indication information carried in the first ETSB, of which TX an equalization parameter needs to be adjusted this time. In this way, when quantities of RXs and TXs on the first data interface are different and the RXs and the TXs on the first data interface cannot be in a one-to-one correspondence, an equalization parameter of a specified TX can also be adjusted. This has better universal applicability.

DESCRIPTION OF EMBODIMENTS

Embodiments of this application provide a data interface equalization method. According to the method, equalization parameters of two data interfaces that need to perform data transmission can be adjusted. The data interface equalization method provided in embodiments of this application is applicable to a data interface having same quantities of RXs and TXs, or a data interface having different quantities of RXs and TXs.

Figure 1:
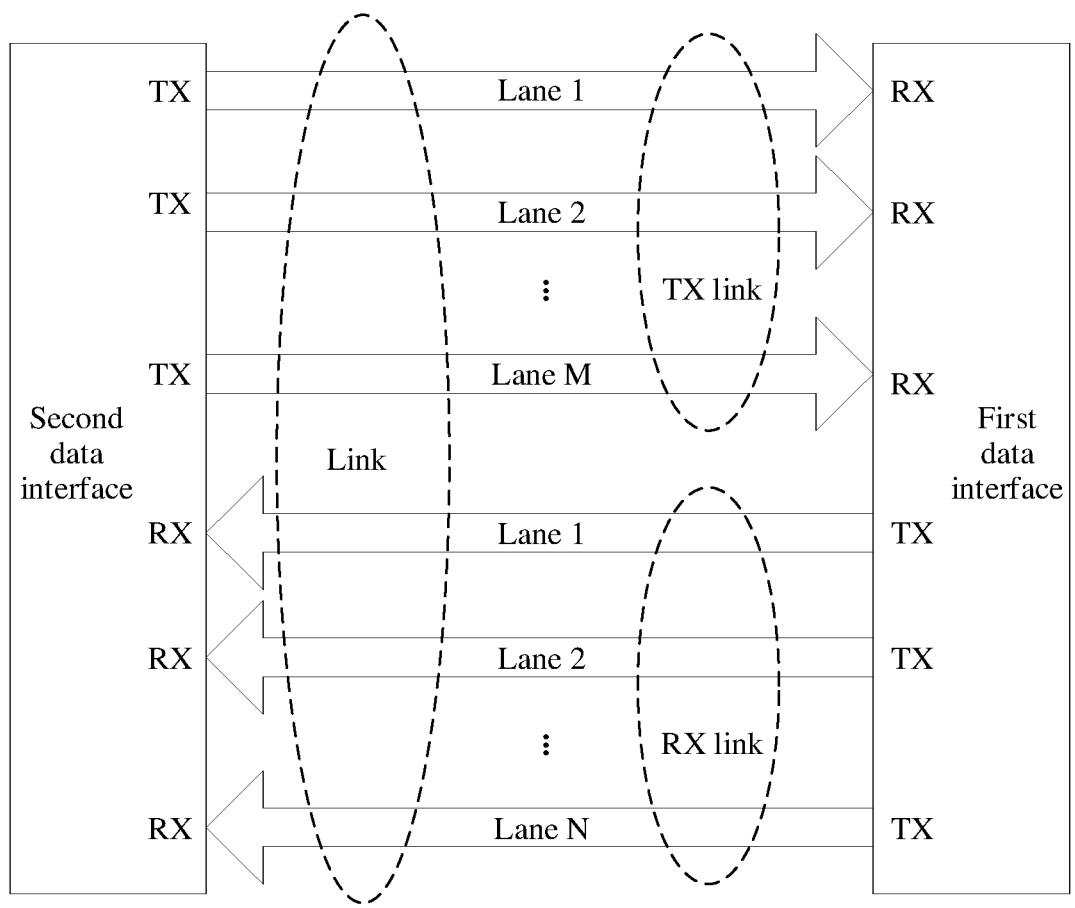
FIG. 1 is a topology diagram of a first data interface and a second data interface according to an embodiment of this application.

FIG. 1 is a topology diagram of a first data interface and a second data interface that need to perform data transmission. Based on a relative direction of data sending or receiving, data interfaces can be classified into upstream ports and downstream ports. For example, if the second data interface is an upstream port, the first data interface is a downstream port. For another example, the first data interface is an upstream port, and correspondingly, the second data interface is a downstream port.

In FIG. 1, the first data interface includes N TXs and M RXs. Correspondingly, the second data interface includes M RXs and N TXs. The N TXs on the first data interface are in a one-to-one correspondence with the N RXs on the second data interface, to form N lanes. The M RXs on the first data interface are in a one-to-one correspondence with the M TXs on the second data interface, to form M lanes. It should be noted that M and N are positive integers, and may be the same or may be different. This is not limited in this embodiment of this application.

In addition, M+N lanes between the first data interface and the second data interface form a data transmission link between the first data interface and the second data interface. From a perspective of the first data interface, lanes to which the TXs on the first data interface belong to a TX link, and lanes to which the RXs on the first data interface belong to an RX link.

Figure 2:
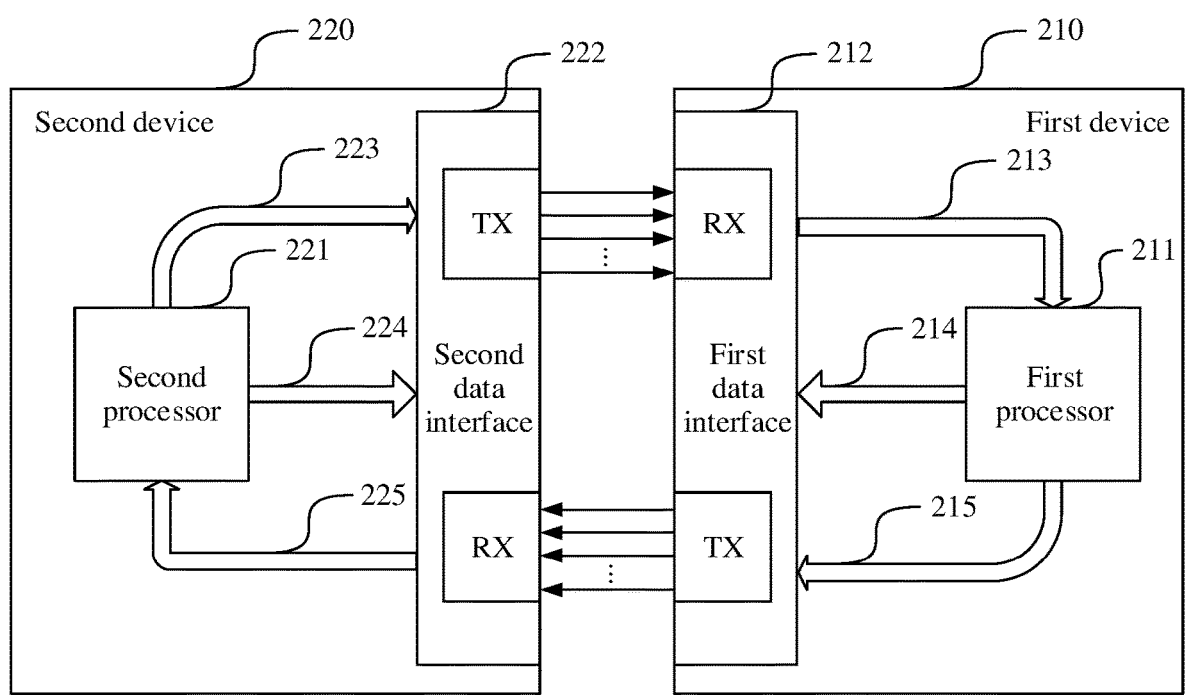
FIG. 2 is a diagram of a communication system according to an embodiment of this application.

The data interface equalization method provided in embodiments of this application may be applied to a communication system. FIG. 2 shows a communication system according to an embodiment. The communication system shown in FIG. 2 includes a first device 210 and a second device 220. The first device may be a computer, a server, or the like. Similarly, the second device may also be a computer, a server, or the like.

The first device 210 includes a first processor 211 and a first data interface 212. A plurality of information exchange lanes may exist between the first processor 211 and the first data interface 212, for example, a first information exchange lane 213, a second information exchange lane 214, and a third information exchange lane 215. The second device 220 includes a second processor 221 and a second data interface 222. A plurality of information exchange lanes may exist between the second processor 221 and the second data interface 222, for example, a fourth information exchange lane 223, a fifth information exchange lane 224, and a sixth information exchange lane 225.

Both the first processor 211 and the second processor 221 may be central processing units (CPUs).

The following describes functions of the information exchange lanes.

The first processor 211 sends data information to the first data interface 212 through the first information exchange lane 213. The data information may be an ETSB used to adjust an equalization parameter of a TX on the second data interface 222. The first processor 211 controls the first data interface 212 through the second information exchange lane 214 to configure quantities of RXs and TXs, configure an equalization parameter, and the like. The first data interface 212 sends data information to the first processor 211 through the third information exchange lane 213. The data information may be an ETSB sent by the second data interface 222 to the first data interface 212, or the like.

The second processor 221 sends data information to the second data interface 222 through the fourth information exchange lane 223. The data information may be an ETSB used to adjust an equalization parameter of a TX on the first data interface 212, or the like. The second processor 221 controls the second data interface 222 through the fifth information exchange lane 224 to configure a quantity of RXs, a quantity of TXs, an equalization parameter, and the like. The second data interface 222 sends data information to the second processor 221 through the sixth information exchange lane 225. The data information may be an ETSB sent by the first data interface 232 to the second data interface 222, or the like.

Figure 3A:
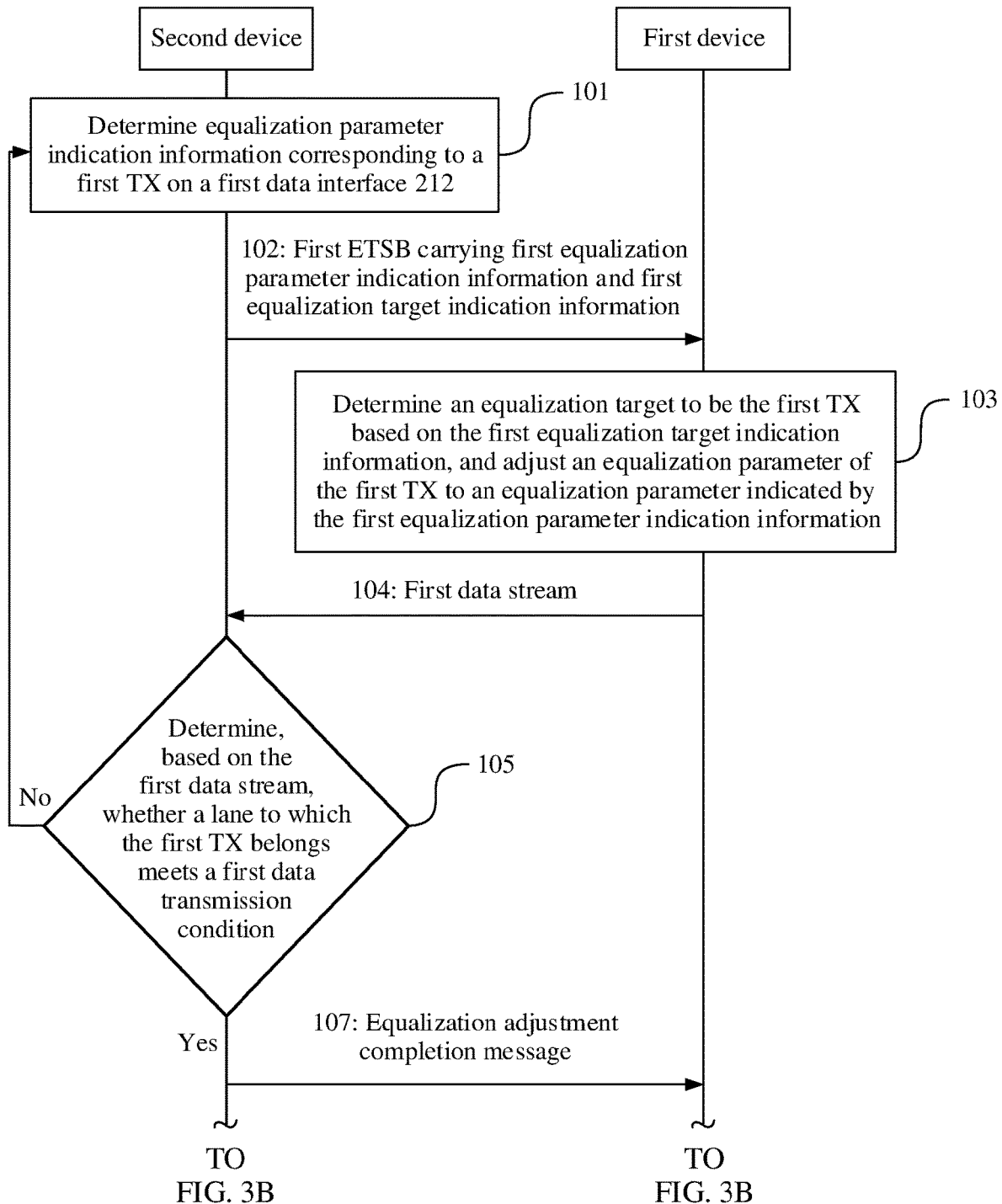
FIG. 3A and FIG. 3B are a flowchart of a data interface equalization adjustment method according to an embodiment of this application.
Figure 3B:
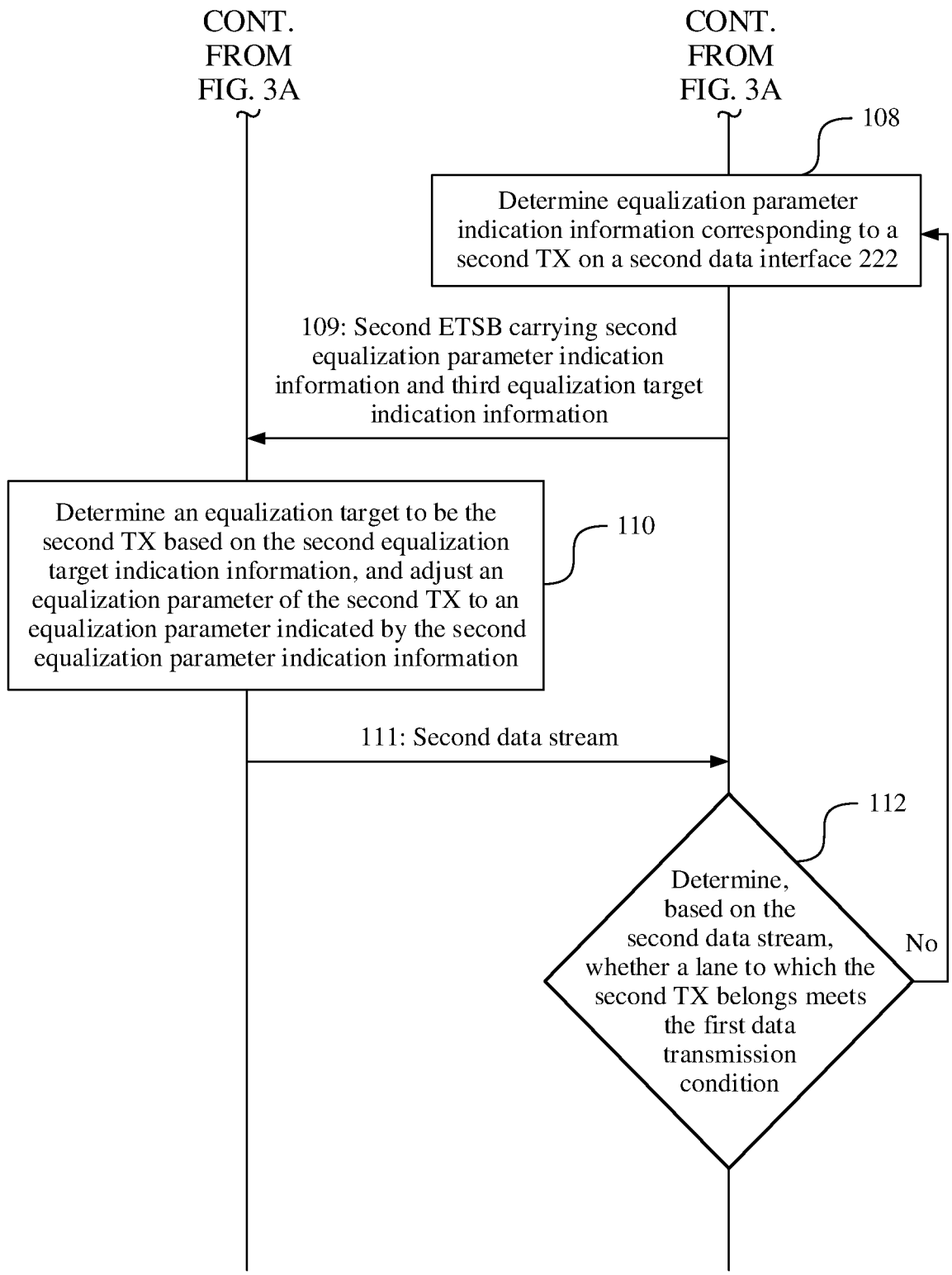

With reference to the communication system shown in FIG. 2, the following describes a data interface equalization method provided in an embodiment of this application. Refer to FIG. 3A and FIG. 3B. The method may include the following steps.

Step 101: The second device 220 determines equalization parameter indication information corresponding to a first TX on the first data interface 212.

In an implementation, when the second device 220 detects that a transmission rate of the second data interface 222 changes, the second device 220 may determine a to-be-used equalization parameter for each TX on the first data interface 212 according to a preset sequence.

The second device 220 may store identifiers of the TXs on the second data interface 222. The second device 220 determines an equalization parameter of each TX on the second data interface 222 according to a storage sequence of the identifiers of the TXs on the second data interface 222. After an equalization parameter of a TX is adjusted, a to-be-used equalization parameter of the TX is no longer determined, and a to-be-used equalization parameter of a next TX starts to be determined.

A method for the second device 220 to determine a to-be-used equalization parameter of any TX (for ease of description, the first TX hereinafter indicates any TX on the first data interface 212) on the first data interface 212 may be as follows:

The second device 220 may store a first equalization parameter set. The first equalization parameter set includes a plurality of groups of equalization parameters. Each group of equalization parameters may include an equalization preset value, an equalization coefficient, and the like. When the second device 220 determines to-be-used equalization parameters for the first TX for the first time, the second device 220 randomly selects a group of equalization parameters from the first equalization parameter set as the to-be-used equalization parameters for the first TX. When selecting to-be-used equalization parameters for the first TX next time, the second device 220 selects the to-be-used equalization parameters for the first TX from an equalization parameter subset that is in the first equalization parameter set and that corresponds to the first TX. The equalization parameter subset corresponding to the first TX includes equalization parameters other than the selected to-be-used equalization parameters for the first TX in the first equalization parameter set.

After determining the to-be-used equalization parameters for the first TX, the second device 220 may further determine first equalization parameter indication information corresponding to the to-be-used equalization parameters for the first TX. There may be a plurality of methods for determining the first equalization parameter indication information, and the following lists several methods for description:

Method 1: The determined to-be-used equalization parameters for the first TX are used as the first equalization parameter indication information.

Method 2: The determined to-be-used equalization parameters for the first TX are multiplied by a preset coefficient, to obtain the first equalization parameter indication information.

Step 102: The second device 220 sends a first ETSB to an RX on the first data interface 212 through a TX on the second data interface 222.

The first ETSB carries the first equalization parameter indication information and first equalization target indication information. The first equalization target indication information indicates that the first TX is an equalization target.

During implementation, after obtaining the equalization parameter indication information of the first TX, the second device 220 encapsulates the equalization parameter indication information of the first TX and the corresponding equalization target indication information into the first ETSB, and sends the first ETSB to the first data interface 212.

There may be a plurality of manners of sending the first ETSB, and several of the manners are listed below for description.

Sending Manner 1

The second device 220 sends one first ETSB through each TX on the second data interface 222.

Sending Manner 2

The second device 220 sends the first ETSB through any TX on the second data interface 222.

Sending Manner 3

The second device 220 splits the first ETSB into a plurality of data segments, sends one data segment in the plurality of data segments through each TX on the second data interface 222 according to an arrangement sequence of the TXs on the second data interface 222. A quantity of split data segments is the same as a quantity of the TXs on the second data interface 222.

Figure 4:
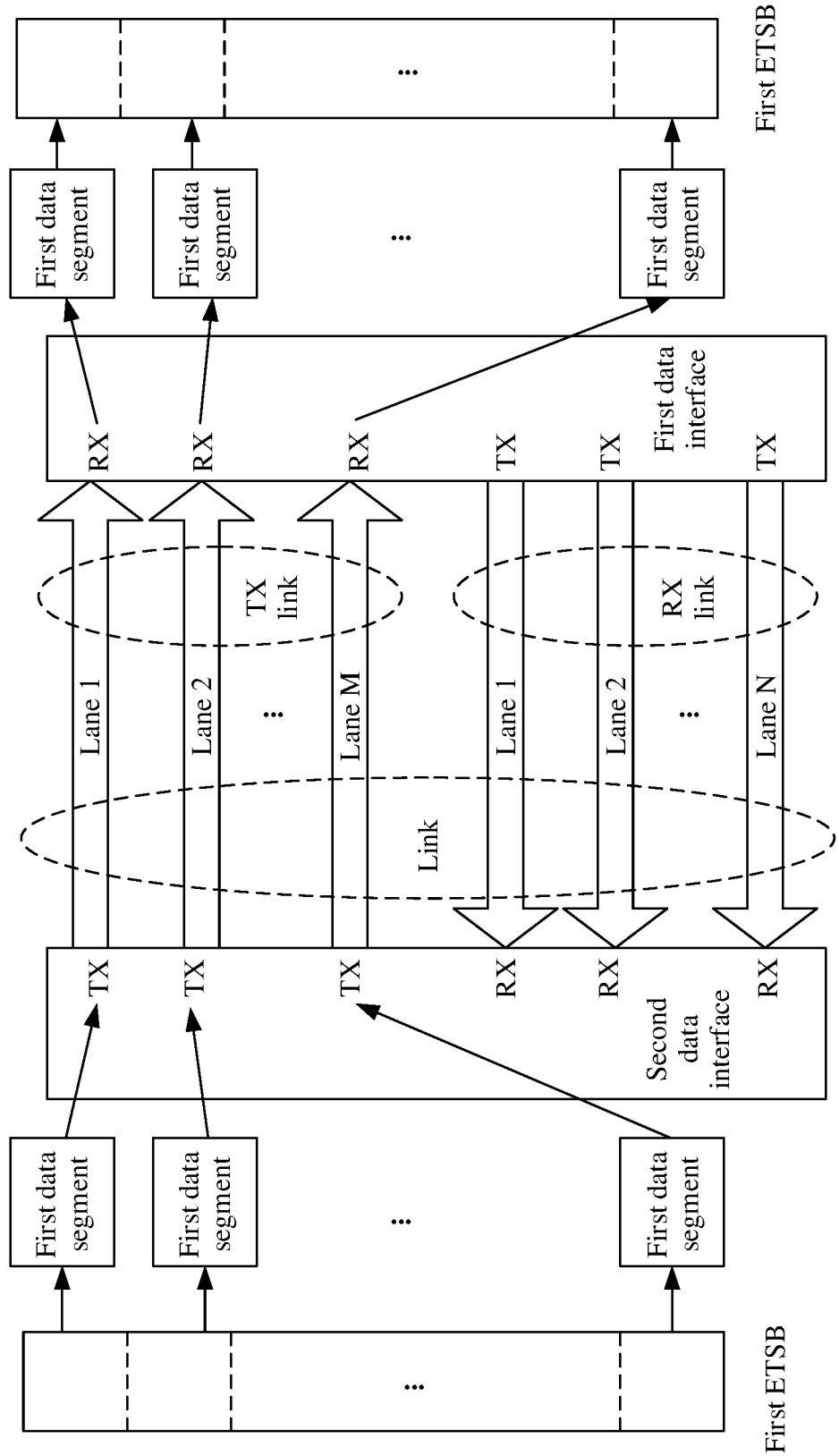
FIG. 4 is a diagram of ETSB splitting and sending according to an embodiment of this application.

As shown in FIG. 4, a second data interface 222 includes M TXs, and the second device 220 splits a first ETSB into M data segments according to a preset rule. According to a front-to-back sequence of the data segments in the first ETSB, the data segments are successively a first data segment 1, a first data segment 2, . . . , and a first data segment M. The preset rule may be average splitting. Then, the second device 220 sends each data segment through a corresponding TX according to a logical sequence of the M TXs on the second data interface 222. The logical sequence of the TXs on the second data interface 222 may be preset by a skilled person.

The following describes equalization target indication information.

The second device 220 stores the equalization target indication information corresponding to TXs on the first data interface 212. The equalization target indication information may be identifiers of lanes to which the TXs on the first data interface belong, or may be identifiers of the TXs on the first data interface. The identifier may be a logical number.

The equalization target indication information corresponding to the TXs may be manually configured, or may be allocated by a processor of a device in which the TXs are located.

When the processor of the device allocates the equalization target indication information, after the equalization target indication information is allocated, the equalization target indication information further needs to be exchanged between the first data interface and the second data interface, so that the second device can learn of equalization target indication information corresponding to the TXs in the first device, and the first device can learn of the equalization target indication information corresponding to the TXs in the second device.

The second device 220 sends the equalization target indication information corresponding to each TX on the second data interface 222 to a corresponding RX on the first data interface 212 through a TX on the second data interface 222. The first device 210 stores received equalization target indication information. The first device 210 sends the equalization target indication information corresponding to each TX on the first data interface 212 to a corresponding RX on the second data interface 222 through a TX on the first data interface 212. The second device 220 stores received equalization target indication information.

Step 103: The first device 210 determines an equalization target to be the first TX based on the first equalization target indication information, and adjusts an equalization parameter of the first TX to an equalization parameter indicated by the first equalization parameter indication information.

During implementation, according to different sending manners of the first ETSB, the first device may obtain the first ETSB in different manners.

For the sending manner 1 and manner 2 of the first ETSB, the first device can directly receive the complete first ETSB. In this case, that the first device receives the first ETSB is obtaining the first ETSB.

For the sending manner 3 of the first ETSB, the first device cannot receive the complete first ETSB, but receives a plurality of first data segments obtained by splitting the first ETSB. In this case, the first device may concatenate, according to a logical sequence of the RXs receiving the data segments on the first data interface 212, the plurality of data segments received, to obtain the first ETSB. The logical sequence of the RXs on the first data interface 212 may be preset by a skilled person.

As shown in FIG. 4, the first data interface 212 may receive the M first data segments, and the first device concatenates the first data segments according to a logical sequence of RXs on a first data interface, to obtain the first ETSB.

After obtaining the first ETSB, the first device 210 obtains the first equalization parameter indication information carried in the first ETSB, and determines the equalization parameter corresponding to the first equalization parameter indication information. According to different methods for determining the equalization parameter indication information, there may also be different methods for determining the equalization parameter corresponding to the first equalization parameter indication information.

For the method 1 for determining the equalization parameter indication information, a method for determining the equalization parameter corresponding to the first equalization parameter indication information is as follows:

The first equalization parameter indication information is used as the corresponding equalization parameter.

For the method 2 for determining the equalization parameter indication information, a method for determining the equalization parameter corresponding to the first equalization parameter indication information is as follows:

The first equalization parameter indication information is divided by the preset coefficient to obtain the corresponding equalization parameter.

For each obtained first ETSB, after obtaining the equalization parameter corresponding to the first equalization parameter indication information carried in the first ETSB, the first device adjusts an equalization parameter of a TX corresponding to the first equalization target indication information carried in the first ETSB to the equalization parameter corresponding to the first equalization parameter indication information.

Step 104: The first device 210 sends a first data stream to a corresponding RX on the second data interface 222 through a TX on the first data interface 212.

The first data stream may be an ETSB, pseudo random binary sequence (PRBS), or the like.

During implementation, after adjusting the equalization parameter of the TX on the first data interface 212, the first device 210 may send the first data stream to the second device 220 through the first data interface 212.

In addition, it should be further noted that a sending manner of the first data stream may be the sending manner 1 or the sending manner 3 in the step 102. Details are not described herein again. In addition, the first data stream may also be sent in the following sending manner 4.

The sending manner 4 is as follows: The first device 210 sends the first data stream through a TX whose equalization parameter is adjusted this time. Herein, the TX whose equalization parameter is adjusted this time is the first TX.

Step 105: The second device 220 determines, based on the first data stream, whether a lane to which the first TX belongs meets a first data transmission condition.

During implementation, the second device 220 receives the first data stream sent by the first device 210, and determines, based on the first data stream, whether the lane to which the first TX belongs meets the first data transmission condition.

If it is determined that the lane to which the first TX belongs meets the first data transmission condition, and the first TX is not a last TX on the first data interface 212, an equalization parameter of a next TX on the first data interface 212 continues to be adjusted.

If it is determined that the lane to which the first TX belongs meets the first data transmission condition, and the first TX is the last TX on the first data interface 212, step 107 continues to be performed.

If it is determined that the lane to which the first TX belongs does not meet the first data transmission condition, the step 101 is performed, to continue to adjust the equalization parameter of the first TX.

The foregoing first data transmission condition may be that a bit error rate of the lane is less than a first threshold, and a value of the first threshold may be set by a skilled person based on an actual data transmission quality requirement. Correspondingly, that the second device 220 determines, based on the first data stream, whether the lane to which the first TX belongs meets the first data transmission condition is that the second device 220 determines, based on the first data stream, the bit error rate of the lane to which the first TX belongs, and determines whether the bit error rate is less than a first preset threshold.

In addition, it should be further noted that, if the first data stream is sent in the sending manner 3, processing in which the second device 220 determines, based on the first data stream, whether the lane to which the first TX belongs meets the first data transmission condition is: The second device 220 determines, based on a target data segment of the first data stream, whether the lane to which the first TX belongs meets the first data transmission condition. The target data segment is a data segment sent by the first TX in a data segment obtained by splitting the first data stream.

Figure 5A:
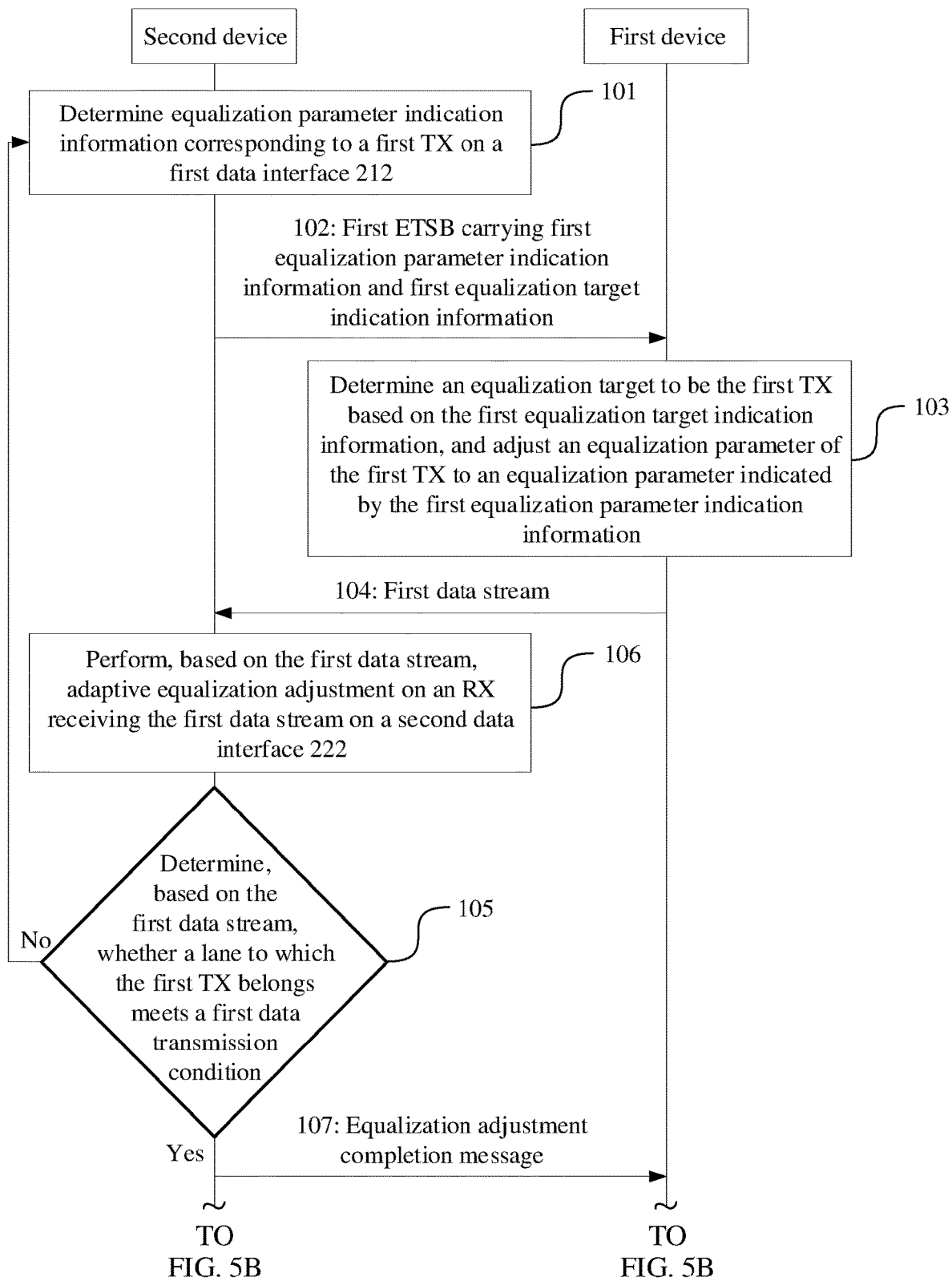
FIG. 5A and FIG. 5B are a flowchart of a data interface equalization adjustment method according to an embodiment of this application.
Figure 5B:
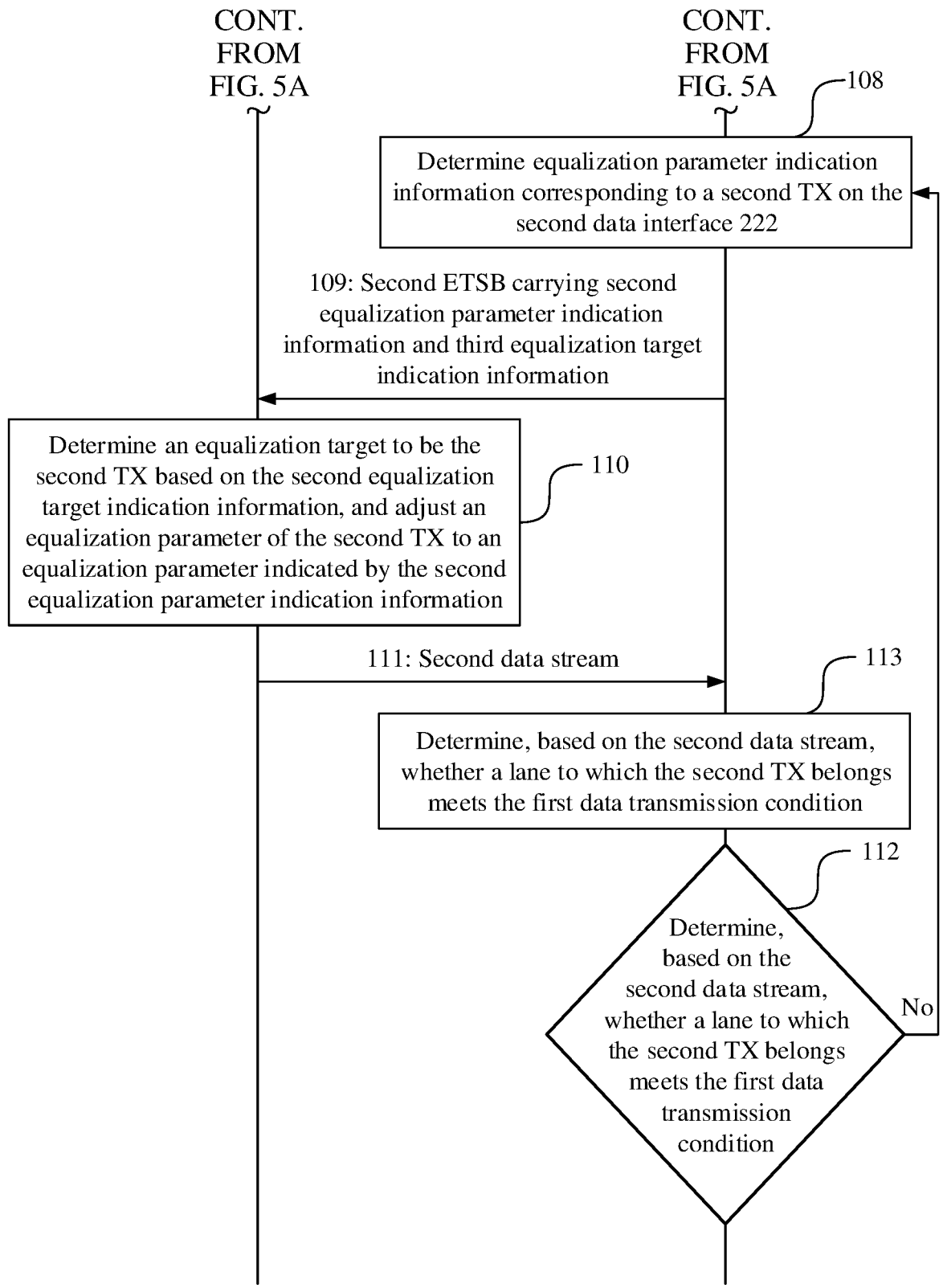

Refer to FIG. 5A and FIG. 5B. In an implementation, after receiving the first data stream, the second device 220 may further perform the following step 106 to perform equalization adjustment on an RX on the second data interface 222.

Step 106: The second device 220 performs, based on the first data stream, adaptive equalization adjustment on the RX receiving the first data stream on the second data interface 222.

The following describes the step 106 for different sending manners of the first data stream.

When the first data stream is sent in the sending manner 1, processing in the step 106 may be as follows:

Each RX on the second data interface 222 may receive one first data stream. Correspondingly, for each RX on the second data interface 222, the second device 220 may perform adaptive equalization adjustment on the RX based on the first data stream received by the RX.

When the first data stream is sent in the sending manner 3, processing in the step 106 may be as follows:

Each RX on the second data interface 222 may receive one data segment of the first data stream. Correspondingly, for each RX on the second data interface 222, the second device 220 may perform adaptive equalization adjustment on the RX based on the data segment received by the RX.

When the first data stream is sent in the sending manner 4, processing in the step 106 may be as follows:

A first RX on the second data interface 222 receives the first data stream sent by the first TX on the first data interface 212, and the second device performs adaptive equalization adjustment on the first RX based on the first data stream. The first RX is an RX that is on the first data interface 212 and that belongs to a same lane as the first TX.

In addition, it should be further noted that the step 106 may be performed before the step 105, or may be performed after the step 105. This is not limited in this embodiment of this application.

Step 107: The second device 220 sends an equalization adjustment completion message to a corresponding RX on the first data interface 210 through a TX on the second data interface 222.

The equalization adjustment completion message may also be an ETSB. The equalization adjustment message indicates that lanes to which the RXs on the second data interface 222 belong already meet the first data transmission condition, that is, equalization parameters of the TXs on the first data interface 212 have been adjusted.

During implementation, when determining that the lane to which the first TX belongs meets the first data transmission condition and the first TX is the last TX on the first data interface 212, the second device 220 sends the equalization adjustment completion message to the RX on the first data interface 210. A manner of sending the equalization adjustment completion message may be one of the sending manner 1, the sending manner 2, or the sending manner 3.

Step 108: The first device 210 determines equalization parameter indication information corresponding to a second TX on the second data interface 222.

The second TX is any TX on the second data interface 222.

During implementation, after receiving the equalization adjustment completion message sent by the second device 220, the first device 210 starts to perform the step 108.

Step 109: The first device 210 sends a second ETSB to an RX on the second data interface 222 through a TX on the first data interface 212.

The second ETSB carries second equalization parameter indication information and second equalization target indication information. The second equalization target indication information indicates that the second TX is an equalization target.

Step 110: The second device 220 determines an equalization target to be the second TX based on the second equalization target indication information, and adjusts an equalization parameter of the second TX to an equalization parameter indicated by the second equalization parameter indication information.

Step 111: The first device 210 sends a second data stream to a corresponding RX on the second data interface 222 through a TX on the first data interface 212.

The second data stream may be an ETSB, a PRBS, or the like.

Step 112: The first device 210 determines, based on the second data stream, whether a lane to which the second TX belongs meets a first data transmission condition.

During implementation, the first device 210 receives the second data stream sent by the second device 220, and determines, based on the second data stream, whether the lane to which the second TX belongs meets the first data transmission condition.

If it is determined that the lane to which the second TX belongs meets the first data transmission condition, and the second TX is not a last TX on the second data interface 222, an equalization parameter of a next TX on the first data interface 212 continues to be adjusted.

If it is determined that the lane to which the second TX belongs meets the first data transmission condition, and the second TX is a last TX on the second data interface 222, it is determined that adjustment of the equalization parameters of the TXs on the second data interface 222 is completed, and processing of determining an equalization parameter of a TX on the second data interface 222 is no longer performed.

If it is determined that the lane to which the second TX belongs does not meet the first data transmission condition, the step 108 is performed, to continue to adjust the equalization parameter of the second TX.

In an implementation, after receiving the second data stream, the first device 210 may further perform the following step 113 to perform equalization adjustment on an RX on the first data interface 212.

Step 113: The first device 210 performs, based on the second data stream, adaptive equalization adjustment on the RX receiving the second data stream on the first data interface 212.

In addition, it should be further noted that the step 113 may be performed before the step 112, or may be performed after the step 112. This is not limited in this embodiment of this application.

In addition, it should be further noted that, processing of the second device 220 in the step 108 to the step 113 is the same as or similar to processing of the first device 210 in the step 101 to the step 106, and processing of the first device 210 in the step 108 to the step 113 is the same as or similar to processing of the second device 220 in the step 101 to the step 106. Details are not described herein again.

Figure 6:
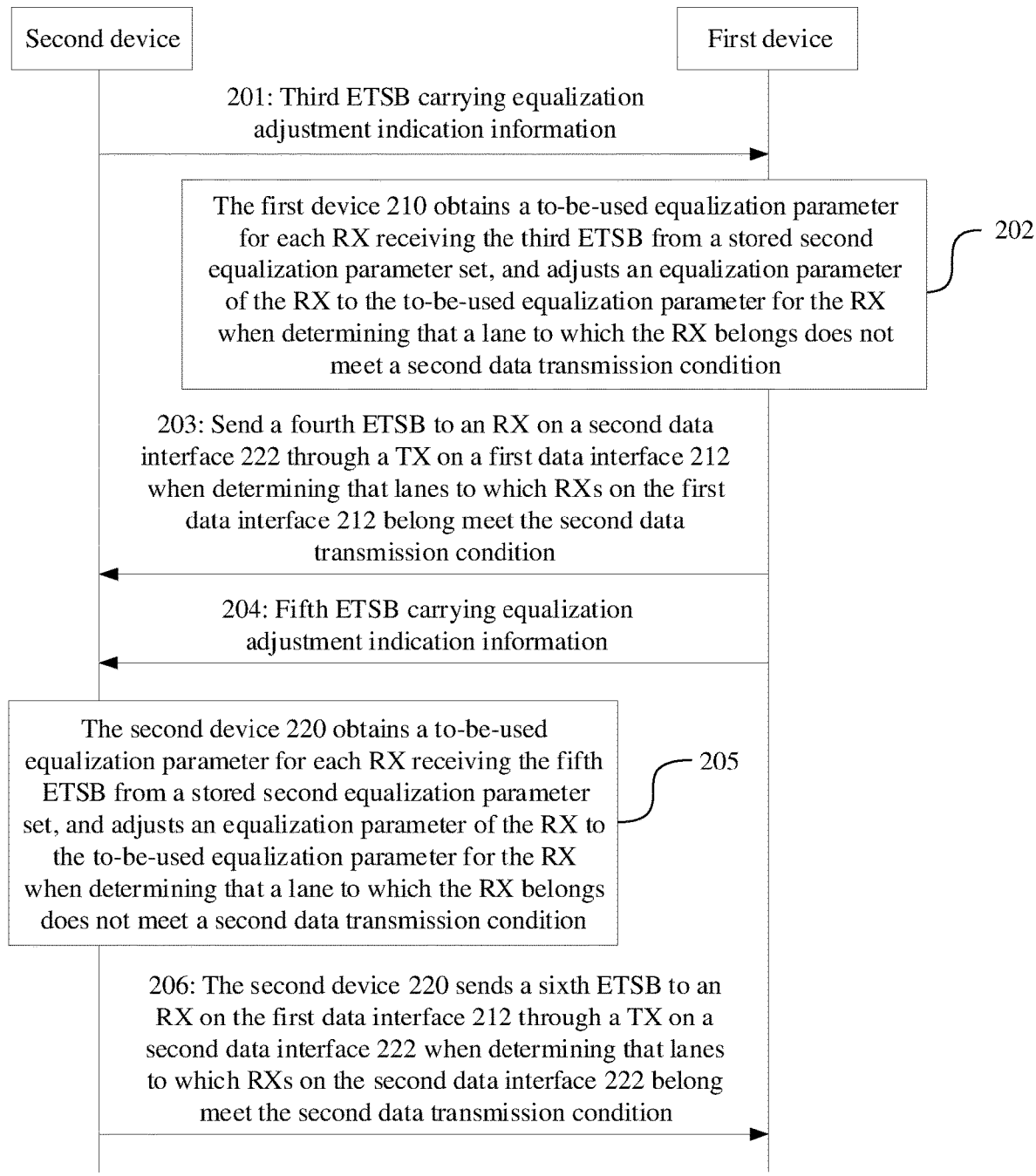
FIG. 6 is a flowchart of a data interface equalization adjustment method according to an embodiment of this application.

In an implementation, before the step 101 is performed, the equalization parameters of RXs on the first data interface and the second data interface may be further pre-adjusted. Refer to FIG. 6. A pre-adjustment method may be as follows:

Step 201: A second device 220 sends a third ETSB to an RX on a first data interface 212 through a TX on a second data interface 222.

The third ETSB carries RX equalization adjustment indication information. For example, the RX equalization adjustment indication information may be carried in a first field in the third ETSB. The first field is filled with a preset value. The preset value may be 1, 0, or the like. The first field may be a field that is agreed on in advance to carry the RX equalization adjustment indication information.

During implementation, a sending manner of the third ETSB may be the sending manner 1 or the sending manner 3. Details are not described herein again.

S202: The first device 210 obtains a to-be-used equalization parameter for each RX receiving the third ETSB from a stored second equalization parameter set, and adjusts an equalization parameter of the RX to the to-be-used equalization parameter of the RX when determining that a lane to which the RX belongs does not meet a second data transmission condition.

The second data transmission condition is that a bit error rate of the lane is less than a second threshold, and the second threshold is greater than the first threshold. A method for determining whether a lane meets the second data transmission condition is the same as or similar to the method for determining whether a lane meets the first data transmission condition in the foregoing embodiment. Details are not described herein again.

A method for determining the to-be-used equalization parameter in the step 202 is the same as or similar to the method for determining the to-be-used equalization parameter in the step 101. Details are not described herein again.

Step 203: The first device 210 sends a fourth ETSB to an RX on the second data interface 222 through a TX on a first data interface 212 when determining that lanes to which RXs on the first data interface 212 belong meet the second data transmission condition.

The fourth ETSB carries RX equalization adjustment completion indication information. For example, the RX equalization adjustment completion indication information may be carried in a second field in the fourth ETSB. The second field is filled with a preset value. The preset value may be 1, 0, or the like. The second field may be a field that is agreed on in advance to carry the RX equalization adjustment indication information.

During implementation, the first device 210 encapsulates the RX equalization adjustment completion indication information into the fourth ETSB, and sends the fourth ETSB to the second device 220 when determining that the lanes to which the RXs on the first data interface 212 belong meet the second data transmission condition. After receiving the fourth ETSB sent by the first device 210, the second device 220 may stop sending the third ETSB to the first device 210.

Step 204: The first device 210 sends a fifth ETSB to a corresponding RX on the second data interface 222 through a TX on the first data interface 212.

The fifth ETSB also carries RX equalization adjustment indication information. In addition, the fifth ETSB may be the same as the third ETSB.

During implementation, the step 204 may be performed after the first device 210 receives the first ETSB for the first time. That is, after receiving the first ETSB for the first time, the first device 210 generates the fifth ETSB, and sends the fifth ETSB to the second device 220.

A sending manner of the fifth ETSB may be the sending manner 1 or the sending manner 3. Details are not described herein again.

Step 205: The second device 220 obtains a to-be-used equalization parameter for each RX receiving the fifth ETSB from a stored second equalization parameter set, and adjusts an equalization parameter of the RX to the to-be-used equalization parameter of the RX when determining that a lane to which the RX belongs does not meet a second data transmission condition.

Step 206: The second device 220 sends a sixth ETSB to an RX on the first data interface 212 through a TX on a second data interface 222 when determining that lanes to which RXs on the second data interface 222 belong meet the second data transmission condition.

The sixth ETSB carries RX equalization adjustment completion indication information. The sixth ETSB may be the same as the fourth ETSB.

During implementation, the second device 220 encapsulates the RX equalization adjustment completion indication information into the sixth ETSB, and sends the sixth ETSB to the first device 210 when determining that the lanes to which the RXs on the second data interface 222 belong meet the second data transmission condition. After receiving the RX equalization adjustment completion message, the first device 210 may stop sending the fifth ETSB to the second device 220.

In addition, when the second device 220 receives the RX equalization adjustment completion message sent by the first device 210 and sends the RX equalization adjustment completion message to the first device 210, the second device 220 may continue to perform the step 101.

Figure 7A:
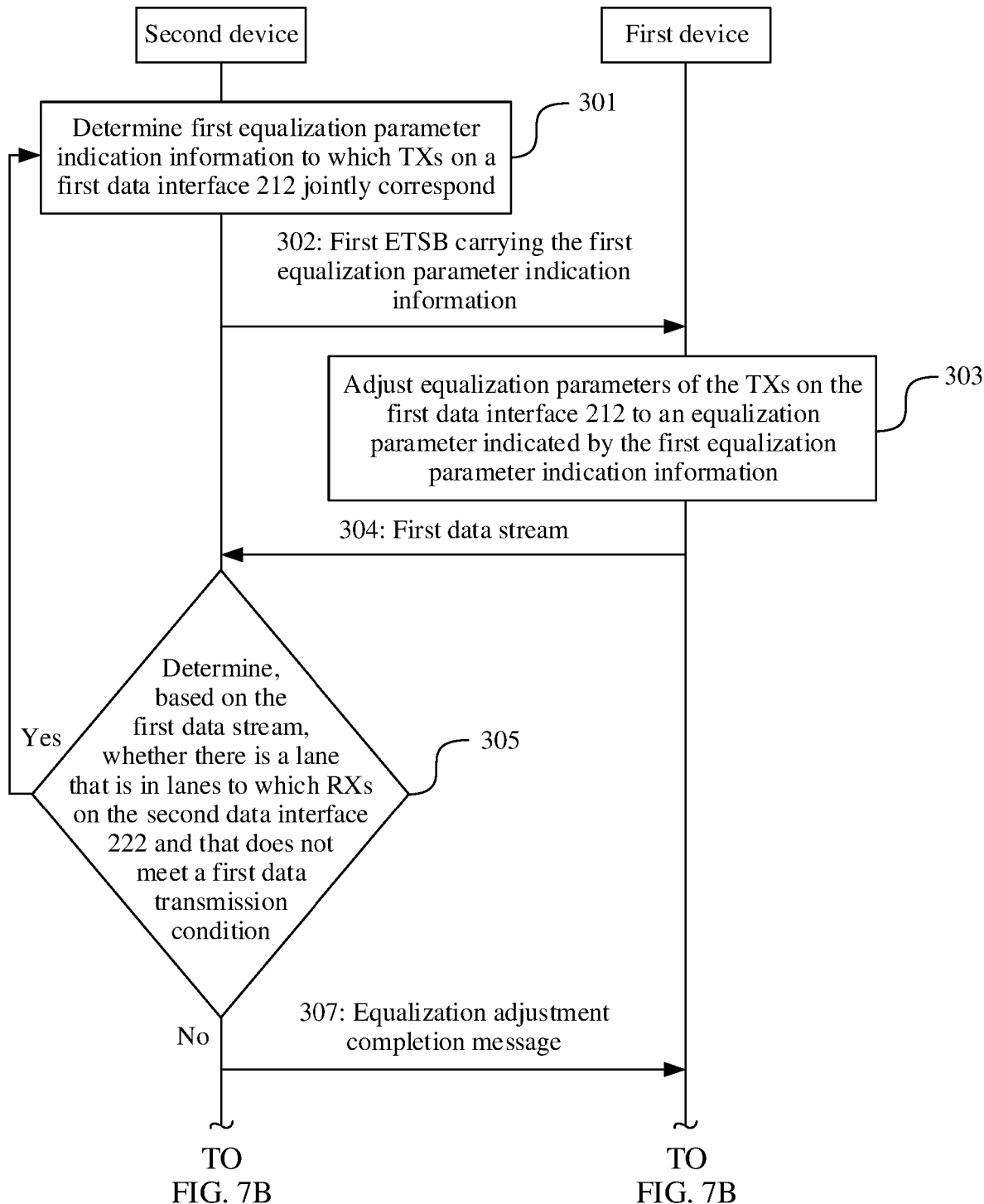
FIG. 7A and FIG. 7B are a flowchart of a data interface equalization adjustment method according to an embodiment of this application.
Figure 7B:
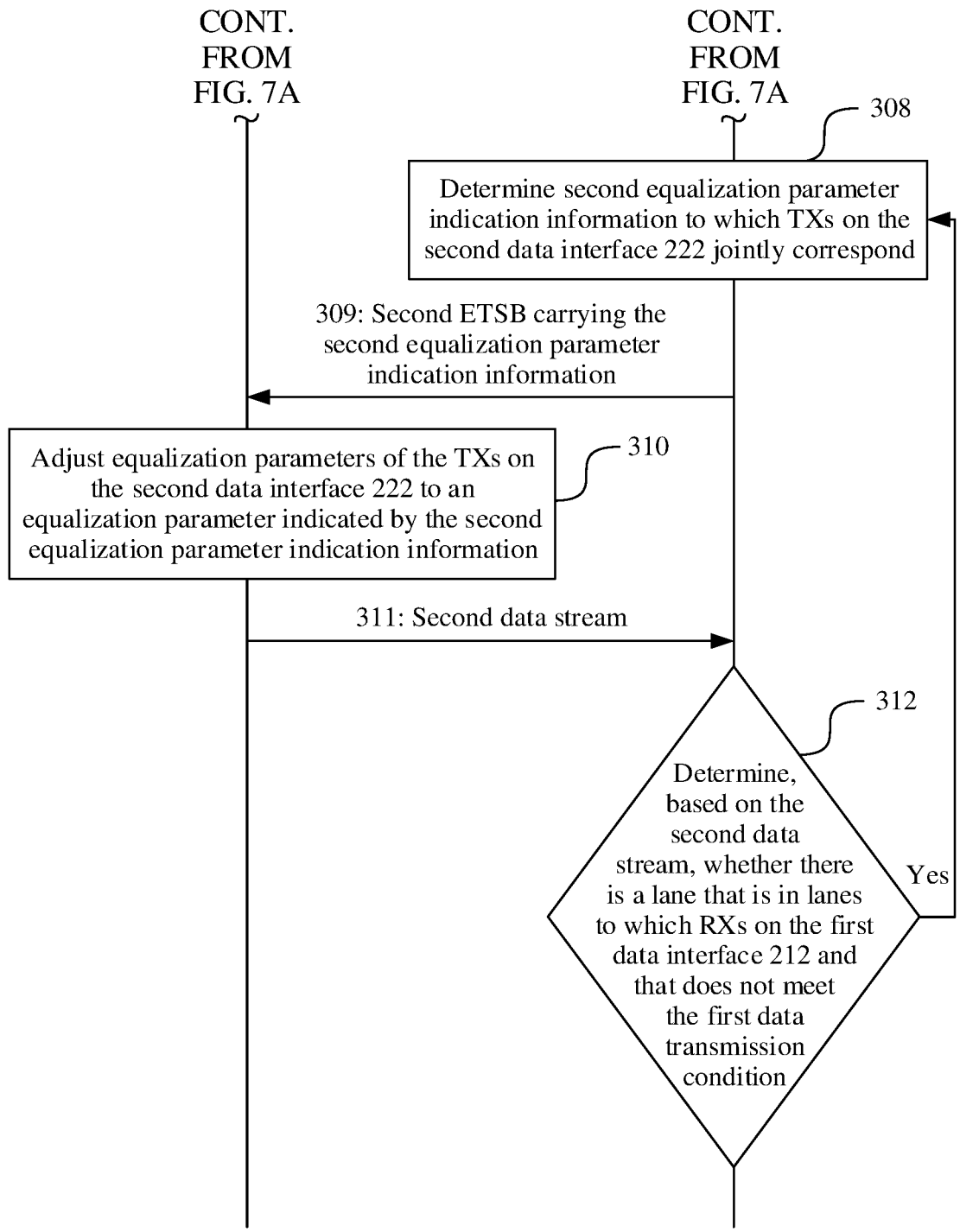

An embodiment of this application further provides a data interface equalization method. Refer to FIG. 7A and FIG. 7B. The method may include the following steps.

Step 301: A second device 220 determines first equalization parameter indication information to which TXs on a first data interface 212 jointly correspond.

During implementation, when the second device 220 detects that a transmission rate of the second data interface 222 changes, the second device 220 determines one to-be-used equalization parameter of all the TXs on the first data interface 212.

A method for the second device 220 to determine the to-be-used equalization parameter may be as follows:

The second device 220 may store a first equalization parameter set. The first equalization parameter set includes a plurality of groups of equalization parameters. Each group of equalization parameters may include an equalization preset value, an equalization coefficient, and the like. When the second device 220 determines to-be-used equalization parameters for the first time, the second device 220 randomly selects a group of equalization parameters from the first equalization parameter set as the to-be-used equalization parameters. When to-be-used equalization parameters are selected next time, the second device 220 randomly selects a group of equalization parameters from the equalization parameters that are not selected in the first equalization parameter set as the to-be-used equalization parameter.

After determining the to-be-used equalization parameter to which the TXs on the first data interface 212 jointly correspond, the second device 220 may further determine the first equalization parameter indication information corresponding to the to-be-used equalization parameter. There may be a plurality of methods for determining the first equalization parameter indication information, and the following lists several methods for description:

Method 1: The determined to-be-used equalization parameters are used as the first equalization parameter indication information.

Method 2: The determined to-be-used equalization parameters are multiplied by a preset coefficient, to obtain the first equalization parameter indication information.

Step 302: The second device 220 sends a first ETSB to a corresponding RX on the first data interface through a TX on the second data interface 222.

The first ETSB carries the first equalization parameter indication information.

During implementation, after obtaining the equalization parameter indication information of the first TX, the second device 220 encapsulates the equalization parameter indication information of the first TX and the corresponding equalization target indication information into the first ETSB, and sends the first ETSB to the first data interface 212.

There may be a plurality of manners of sending the first ETSB, and several of the manners are listed below for description.

Sending Manner 1

The second device 220 sends the first ETSB through any TX on the second data interface 222.

Sending Manner 2

The second device 220 sends one first ETSB through each TX on the second data interface 222.

Sending Manner 3

The second device 220 splits the first ETSB into a plurality of data segments, sends one second data segment in the plurality of data segments through each TX on the second data interface 222 according to an arrangement sequence of the TXs on the second data interface 222. A quantity of split data segments is the same as a quantity of the TXs on the second data interface 222.

Step 303: A first device 210 adjusts equalization parameters of the TXs on the first data interface 212 to an equalization parameter indicated by the equalization parameter indication information.

During implementation, according to different sending manners of the first ETSB, the first device 210 may obtain the first ETSB in different manners.

For the sending manner 1 and manner 2 of the first ETSB, the first device can directly receive the complete first ETSB. In this case, that the first device receives the first ETSB is obtaining the first ETSB.

For the sending manner 3 of the first ETSB, the first device cannot receive the complete first ETSB, but receives a plurality of first data segments obtained by splitting the first ETSB. In this case, the first device may concatenate, according to a logical sequence of the RXs receiving the data segments on the first data interface 212, the plurality of data segments received, to obtain the first ETSB. The logical sequence of the RXs on the first data interface 212 may be preset by a skilled person.

After obtaining the first ETSB, the first device 210 obtains the first equalization parameter indication information carried in the first ETSB, and determines the equalization parameter corresponding to the first equalization parameter indication information. Then, the first device 210 adjusts the equalization parameters of the TXs on the first data interface 212 to an equalization parameter corresponding to the equalization parameter indication information.

According to different methods for determining the equalization parameter indication information, there may also be different methods for determining the equalization parameter corresponding to the first equalization parameter indication information.

For the method 1 for determining the equalization parameter indication information, a method for determining the equalization parameter corresponding to the first equalization parameter indication information is as follows:

The first equalization parameter indication information is used as the corresponding equalization parameter.

For the method 2 for determining the equalization parameter indication information, a method for determining the equalization parameter corresponding to the first equalization parameter indication information is as follows:

The first equalization parameter indication information is divided by the preset coefficient to obtain the corresponding equalization parameter.

Step 304: The first device 210 sends a first data stream to RXs on the second data interface 222 through the TXs on the first data interface 212.

The first data stream may be an ETSB, a PRBS, or the like.

During implementation, after adjusting the equalization parameters of the TXs on the first data interface 212, the first device 210 may send the first data stream to corresponding RXs on the second data interface 222 through the TXs on the first data interface 212.

A sending manner of the first data stream may be the sending manner 2 or the sending manner 3.

Step 305: The second device 220 determines, based on the first data stream, whether there is a lane that is in lanes to which the RXs on the second data interface 222 belong and that does not meet the first data transmission condition.

The first data transmission condition may be that a bit error rate of the lane is less than a first threshold.

During implementation, for different sending manners of the first data stream, processing in the step 205 may also be different.

When the first data stream is sent in the sending manner 2, processing in the step 205 may be as follows:

The second device 220 determines, based on the first data stream received by each RX on the second data interface 222, whether a lane to which the RX belongs meets the first data transmission condition.

When the first data stream is sent in the sending manner 3, processing in the step 205 may be as follows:

The second device 220 determines, based on a data segment of the first data stream received by each RX on the second data interface 222, whether a lane to which the RX belongs meets the first data transmission condition.

If determining that all the lanes to which the RXs on the second data interface belong meet the first data transmission condition, the second device 220 continues to perform the step 107.

If determining that there is a lane that is in the lanes to which the RXs on the second data interface belong and that does not meet the first data transmission condition, the second device 220 performs the step 301, and continues to adjust the equalization parameters of the TXs on the first data interface 212.

Figure 8A:
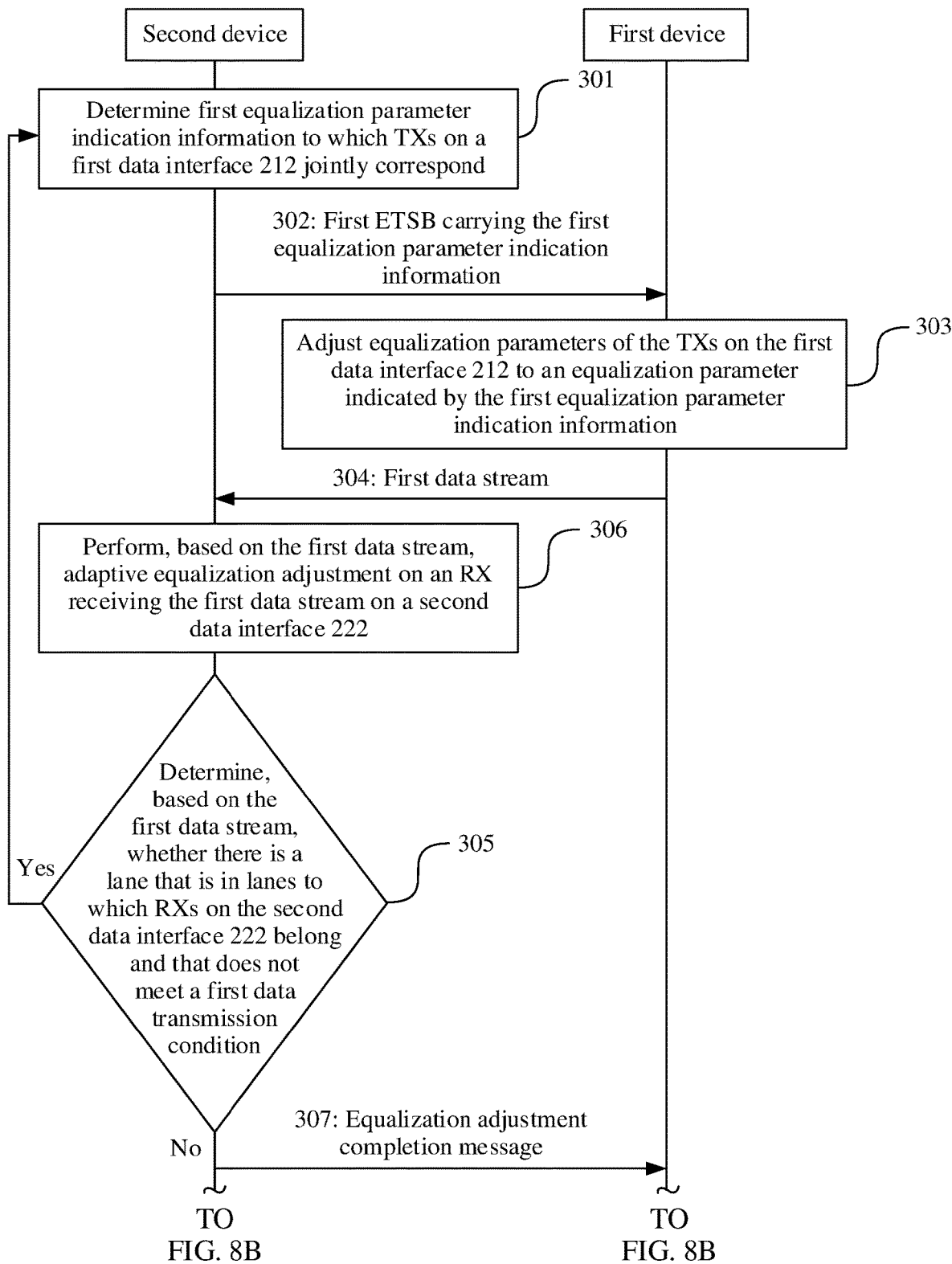
FIG. 8A and FIG. 8B are a flowchart of a data interface equalization adjustment method according to an embodiment of this application.
Figure 8B:
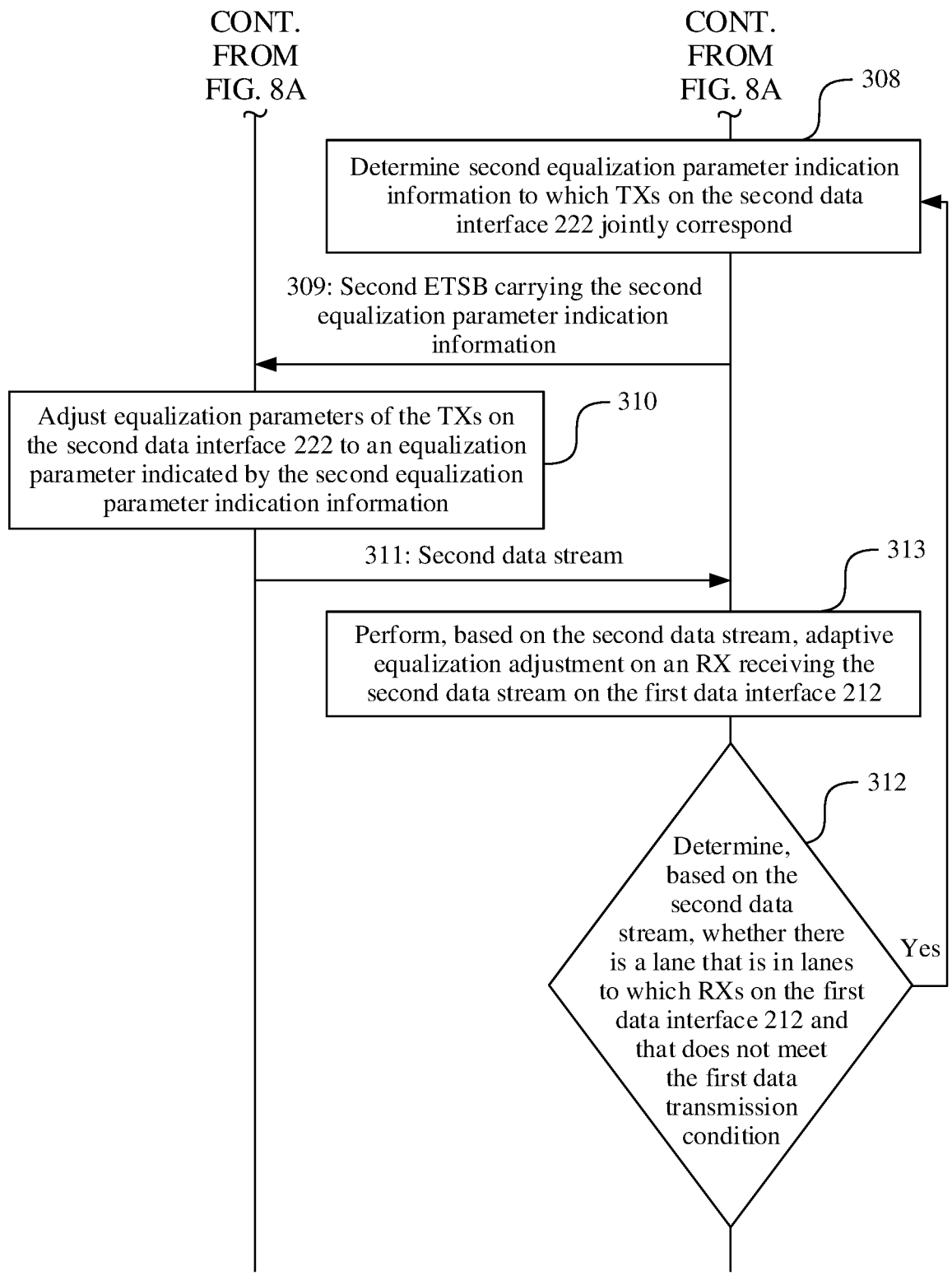

Refer to FIG. 8A and FIG. 8B. In an implementation, after receiving the first data stream, the second device 220 may further perform the following step 306 to perform equalization adjustment on the RXs on the second data interface 222.

Step 306: The second device 220 performs, based on the first data stream, adaptive equalization adjustment on the RX receiving the first data stream on the second data interface 222.

The following describes the step 306 for different sending manners of the first data stream.

When the first data stream is sent in the sending manner 1, processing in the step 306 may be as follows:

Each RX on the second data interface 222 may receive one complete first data stream. Correspondingly, for each RX on the second data interface 222, the second device 220 may perform adaptive equalization adjustment on the RX based on the first data stream received by the RX.

When the first data stream is sent in the sending manner 3, processing in the step 306 may be as follows:

Each on the second data interface 222 may receive one data segment of the first data stream. Correspondingly, for each RX on the second data interface 222, the second device 220 may perform adaptive equalization adjustment on the RX based on the data segment received by the RX.

In addition, it should be further noted that the step 106 may be performed before the step 105, or may be performed after the step 105. This is not limited in this embodiment of this application.

Step 307: The second device 220 sends an equalization adjustment completion message to an RX on the first data interface 210 through a TX on the second data interface 222.

The equalization adjustment completion message may also be an ETSB. The equalization adjustment message indicates that lanes to which the RXs on the second data interface 222 belong already meet the first data transmission condition, that is, equalization parameters of the TXs on the first data interface 212 have been adjusted.

During implementation, when determining all the lanes to which the RXs on the second data interface 222 belong meet the first data transmission condition, the second device 220 the equalization adjustment completion message to RXs on the first data interface 210. A manner of sending the equalization adjustment completion message may be one of the sending manner 1, the sending manner 2, or the sending manner 3.

Step 308: The first device 210 determines second equalization parameter indication information to which the TXs on the second data interface 222 jointly correspond.

Step 309: The first device 210 sends a second ETSB to a corresponding RX on the second data interface through a TX on the first data interface 212.

The second ETSB carries the second equalization parameter indication information.

Step 310: The second device 220 adjusts equalization parameters of the TXs on the second data interface 222 to an equalization parameter indicated by the second equalization parameter indication information.

Step 311: The second device 220 sends a second data stream to RXs on the first data interface 212 through the TXs on the second data interface 222.

The second data stream may be an ETSB, a PRBS, or the like. The second data stream may be the same as the first data stream.

Step 312: The first device 210 determines, based on the second data stream, whether there is a lane that is in lanes to which the RXs on the first data interface 212 belong and that does not meet the first data transmission condition.

During implementation, if determining that there is a lane that is in the lanes to which the RXs on the first data interface 212 belong and that does not meet the first data transmission condition, the first device 210 performs the step 308, and continues to adjust the equalization parameters of the TXs on the second data interface 222.

Refer to FIG. 8A and FIG. 8B. In an implementation, after receiving the second data stream, the first device 210 may further perform the following step 313 to perform equalization adjustment on the RXs on the first data interface 212.

Step 313: The first device 210 performs, based on the second data stream, adaptive equalization adjustment on the RX receiving the second data stream on the first data interface 212.

In addition, it should be further noted that, processing of the second device 220 in the step 308 to the step 313 is the same as or similar to processing of the first device 210 in the step 301 to the step 306, and processing of the first device 210 in the step 308 to the step 313 is the same as or similar to processing of the second device 220 in the step 301 to the step 306. Details are not described herein again.

In an implementation, the foregoing pre-adjustment processing may be further performed before step 301.

Figure 9A:
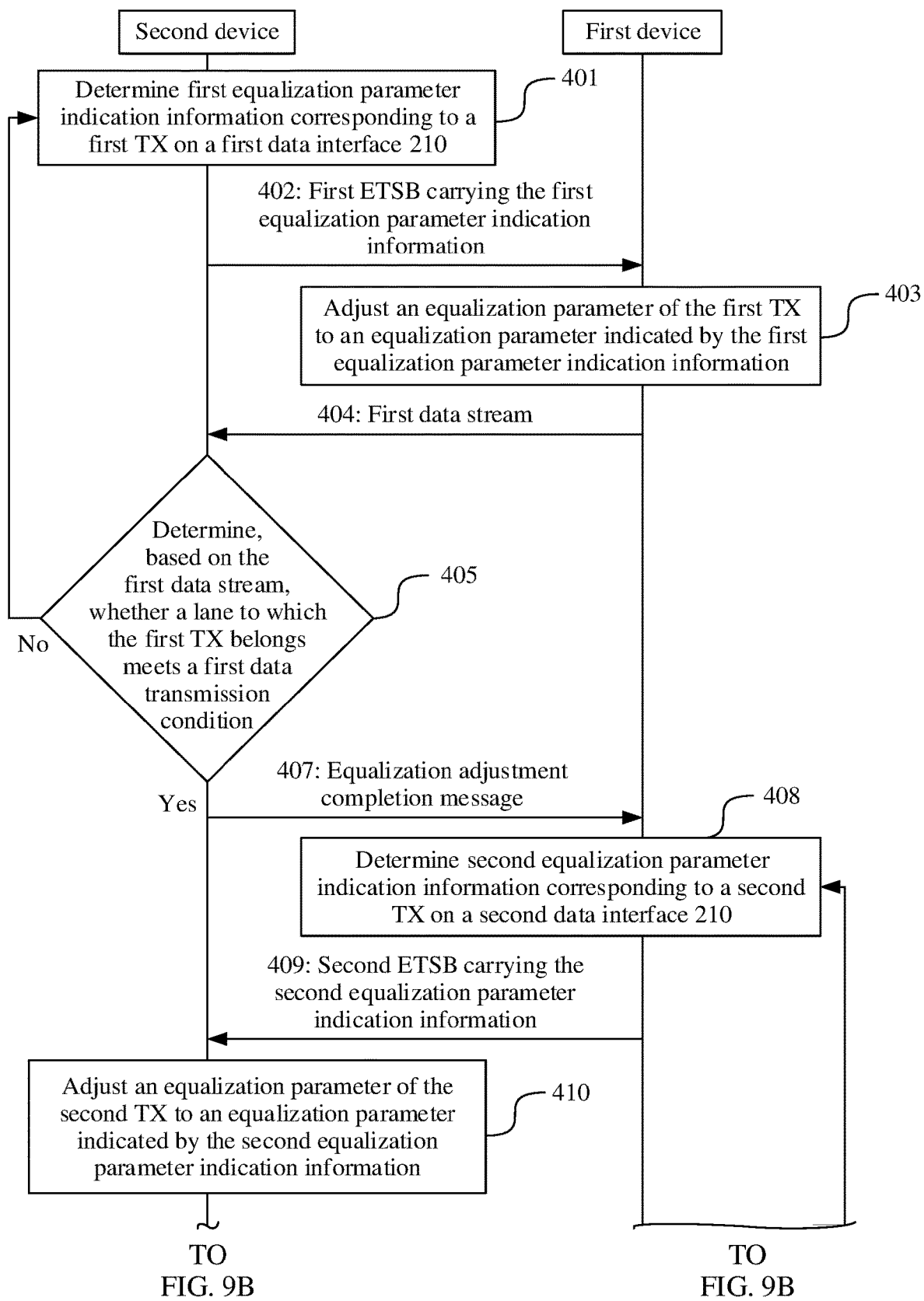
FIG. 9A and FIG. 9B are a flowchart of a data interface equalization adjustment method according to an embodiment of this application.
Figure 9B:
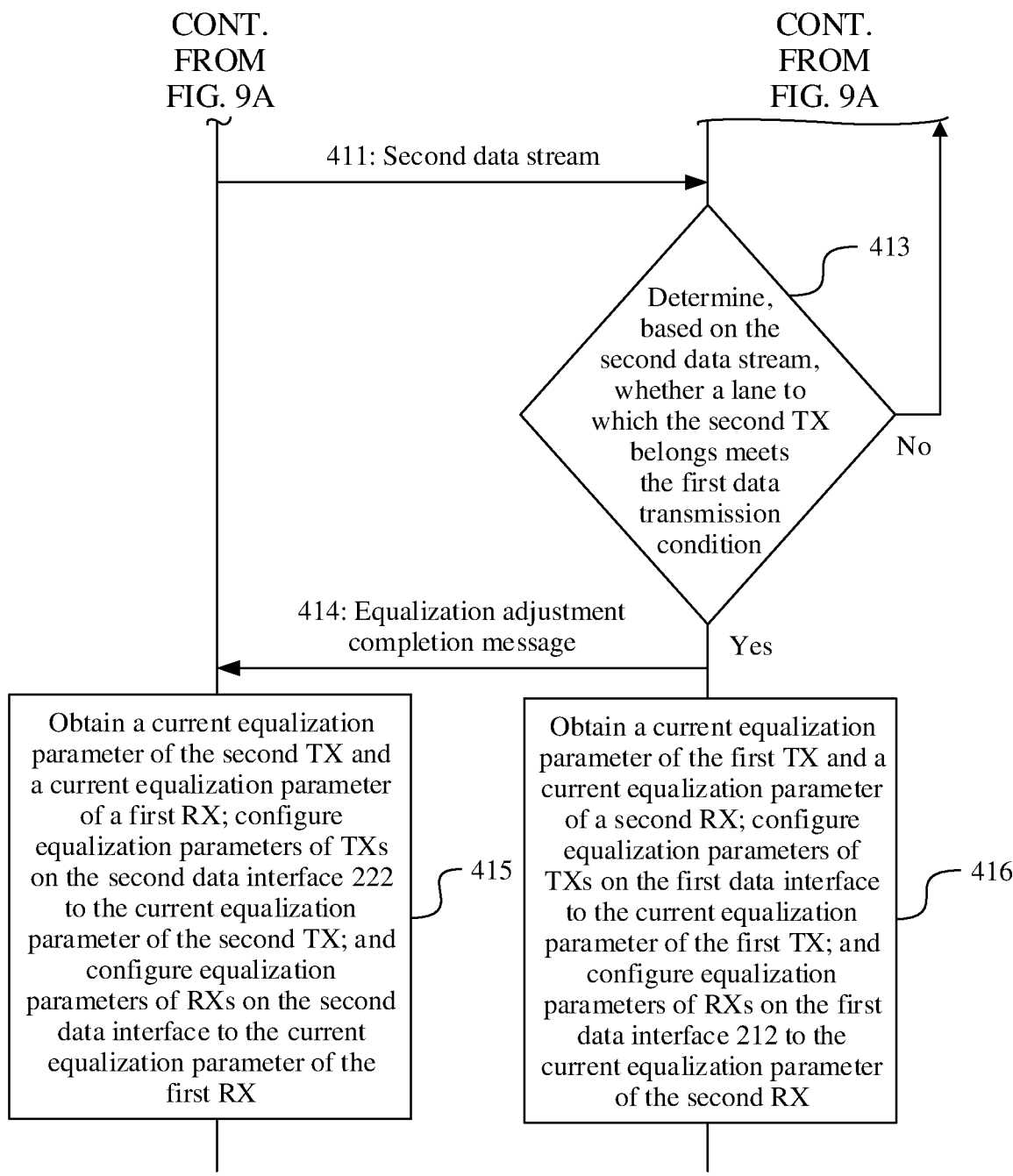

An embodiment of this application further provides a data interface equalization method. Refer to FIG. 9A and FIG. 9B. The method may include the following steps.

Step 401: A second device 220 determines first equalization parameter indication information corresponding to a first TX on a first data interface 210.

The first TX is a pre-specified TX on the first data interface.

In an implementation, when the second device 220 detects that a transmission rate of a second data interface 222 changes, the second device 220 may determine a to-be-used equalization parameter of the first TX on the first data interface 212.

A method for the second device 220 to determine the to-be-used equalization parameter of the first TX on the first data interface 212 may be as follows:

The second device 220 may store a first equalization parameter set. The first equalization parameter set includes a plurality of groups of equalization parameters. Each group of equalization parameters may include an equalization preset value, an equalization coefficient, and the like. When the second device 220 determines to-be-used equalization parameters for the first TX for the first time, the second device 220 randomly selects a group of equalization parameters from the first equalization parameter set as the to-be-used equalization parameters for the first TX. When to-be-used equalization parameters for the first TX are selected next time, the second device 220 randomly selects a group of equalization parameters from the equalization parameters that are not selected in the first equalization parameter set as the to-be-used equalization parameters for the first TX.

After determining the to-be-used equalization parameters for the first TX, the second device 220 may further determine first equalization parameter indication information corresponding to the to-be-used equalization parameters for the first TX. There may be a plurality of methods for determining the first equalization parameter indication information, and the following lists several methods for description:

Method 1: The determined to-be-used equalization parameters for the first TX are used as the first equalization parameter indication information.

Method 2: The determined to-be-used equalization parameters for the first TX are multiplied by a preset coefficient, to obtain the first equalization parameter indication information.

After determining the to-be-used equalization parameters for the first TX, the second device 220 may further determine first equalization parameter indication information corresponding to the to-be-used equalization parameters for the first TX. There may be a plurality of methods for determining the first equalization parameter indication information, and the following lists several methods for description:

Method 1: The determined to-be-used equalization parameters for the first TX are used as the first equalization parameter indication information.

Method 2: The determined to-be-used equalization parameters for the first TX are multiplied by a preset coefficient, to obtain the first equalization parameter indication information.

Step 402: The second device 220 sends a first ETSB to a corresponding RX on the first data interface through a second TX on the second data interface 222.

The second TX is a pre-specified TX on the second data interface. The first ETSB carries the first equalization parameter indication information.

During implementation, the second device 220 encapsulates the first equalization parameter indication information into the first ETSB, and sends the first ETSB to a corresponding RX on the first data interface 212 through the second TX.

Step 403: A first device 210 adjusts an equalization parameter of the first TX to an equalization parameter indicated by the first equalization parameter indication information.

During implementation, after receiving the first ETSB, the first device 210 obtains the first equalization parameter indication information carried in the first ETSB. The corresponding equalization parameter is obtained based on the first equalization parameter indication information. According to different methods for determining the equalization parameter indication information, there may also be different methods for determining the equalization parameter corresponding to the first equalization parameter indication information.

For the method 1 for determining the equalization parameter indication information, a method for determining the equalization parameter corresponding to the first equalization parameter indication information is as follows:

The first equalization parameter indication information is used as the corresponding equalization parameter.

For the method 2 for determining the equalization parameter indication information, a method for determining the equalization parameter corresponding to the first equalization parameter indication information is as follows:

The first equalization parameter indication information is divided by the preset coefficient to obtain the corresponding equalization parameter.

After obtaining the equalization parameter corresponding to the first equalization parameter indication information, the first device 210 adjusts the equalization parameter of the first TX to the equalization parameter corresponding to the first equalization parameter indication information.

Step 404: The first device 210 sends a first data stream to a corresponding RX on the second data interface through the first TX on the first data interface 212.

The first data stream may be an ETSB, a PRBS, or the like.

During implementation, after adjusting the equalization parameter of the first TX on the first data interface 212, the first device 210 may send the first data stream to corresponding RXs on the second data interface 222 through the first TX on the first data interface 212.

Step 405: The second device 220 determines, based on the first data stream, whether a lane to which the first TX belongs meets a first data transmission condition.

During implementation, the second device 220 receives the first data stream sent by the first device 210, and determines, based on the first data stream, whether the lane to which the first TX belongs meets the first data transmission condition.

If it is determined that the lane to which the first TX belongs meets the first data transmission condition, the step 407 continues to be performed.

If it is determined that the lane to which the first TX belongs does not meet the first data transmission condition, the step 401 is performed, to continue to adjust the equalization parameter of the first TX.

The foregoing first data transmission condition may be that a bit error rate of the lane is less than a first threshold, and a value of the first threshold may be set by a skilled person based on an actual data transmission quality requirement. Correspondingly, that the second device 220 determines, based on the first data stream, whether the lane to which the first TX belongs meets the first data transmission condition is that the second device 220 determines, based on the first data stream, the bit error rate of the lane to which the first TX belongs, and determines whether the bit error rate is less than a first preset threshold.

Figure 10A:
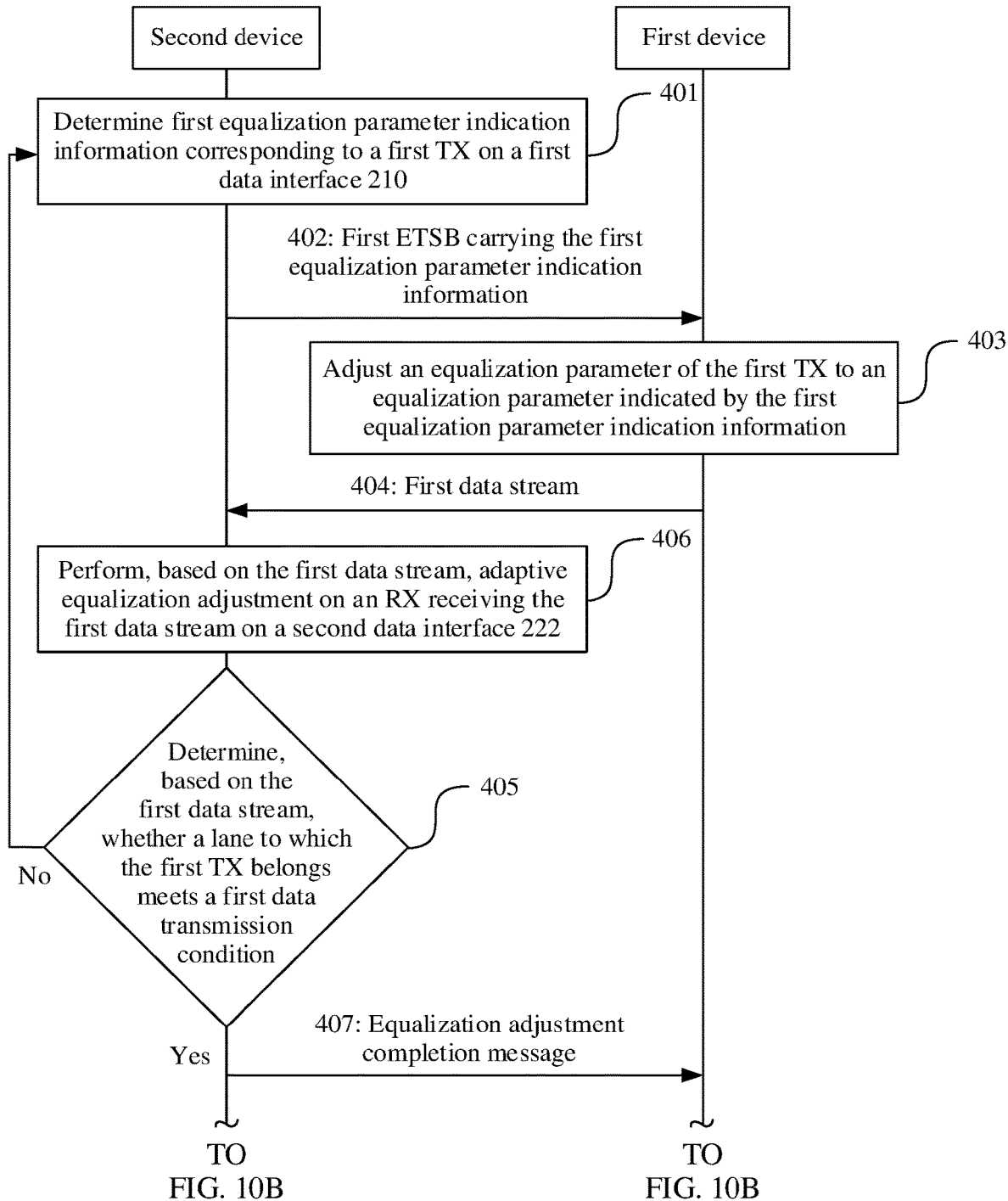
FIG. 10A and FIG. 10B are a flowchart of a data interface equalization adjustment method according to an embodiment of this application.
Figure 10B:
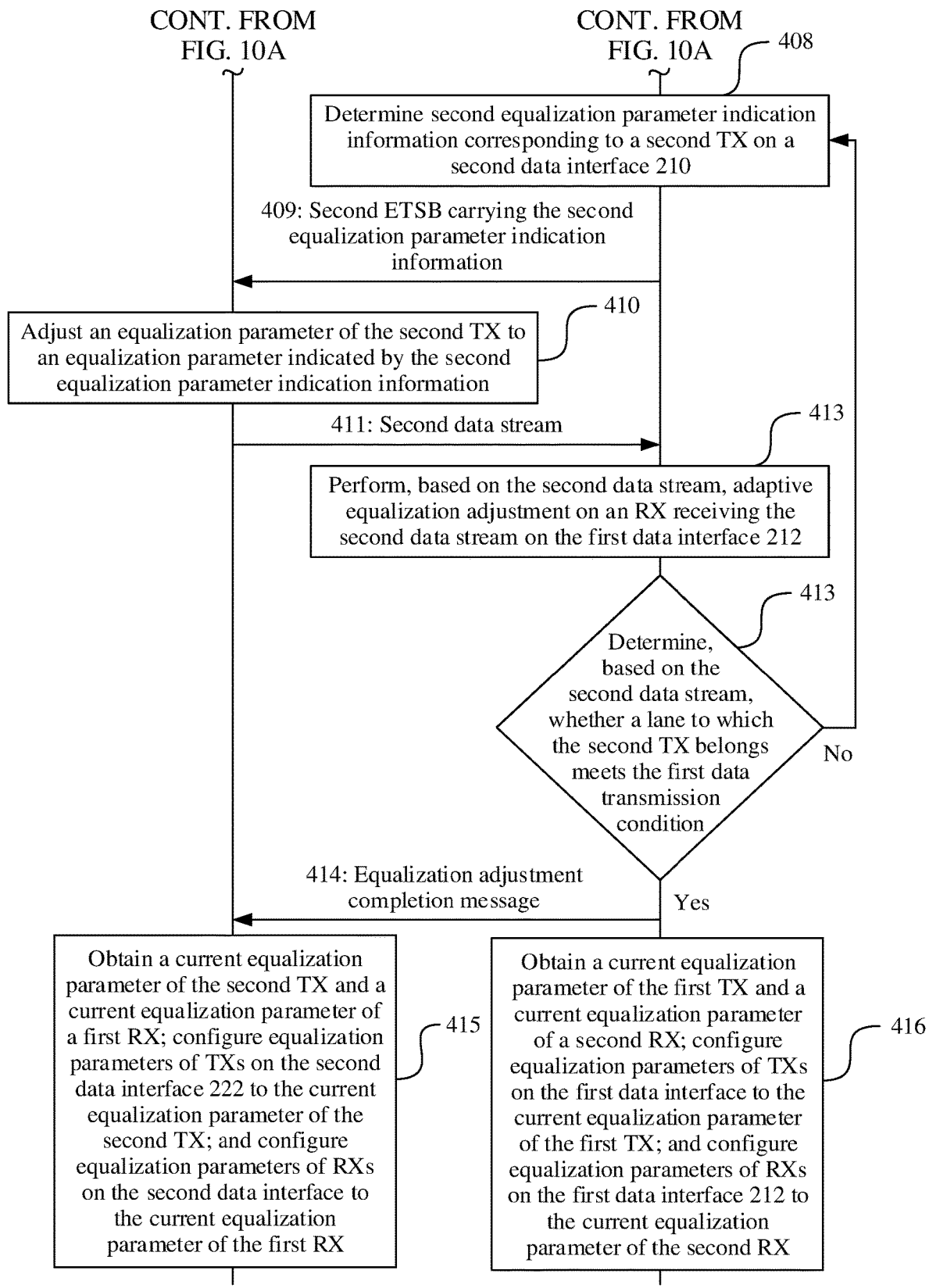

Refer to FIG. 10A and FIG. 10B. In an implementation, after receiving the first data stream, the second device 220 may further perform the following step 406 to perform equalization adjustment on an RX that is on the second data interface 222 and that corresponds to the first TX.

Step 406: The second device 220 performs, based on the first data stream, adaptive equalization adjustment on the RX receiving the first data stream on the second data interface 222.

In addition, it should be further noted that the step 406 may be performed before the step 405, or may be performed after the step 405. This is not limited in this embodiment of this application.

Step 407: The second device 220 sends an equalization adjustment completion message to a corresponding RX on the first data interface 212 through the second TX on the second data interface 222.

The equalization adjustment completion message may also be an ETSB. The equalization adjustment message indicates that the lane to which the first TX belongs already meet the first data transmission condition, that is, the equalization parameter of the first TX have been adjusted.

During implementation, when determining that the lane to which the first TX belongs meets the first data transmission condition, the second device 220 sends the equalization adjustment completion message to the corresponding RX on the first data interface 210 through the second TX.

Step 408: The first device 210 determines second equalization parameter indication information corresponding to the second TX on the second data interface 210.

Step 409: The first device 210 sends a second ETSB to a corresponding RX on the second data interface through a second TX on the first data interface 212.

The second ETSB carries the second equalization parameter indication information.

Step 410: The second device 220 adjusts an equalization parameter of the second TX to an equalization parameter indicated by the second equalization parameter indication information.

Step 411: The second device 220 sends a second data stream to a corresponding RX on the first data interface through the second TX on the second data interface 222.

The second data stream may be an ETSB, a PRBS, or the like.

Step 412: The first device 210 determines, based on the second data stream, whether a lane to which the second TX belongs meets a first data transmission condition.

During implementation, the first device 210 receives the second data stream sent by the second device 220, and determines, based on the second data stream, whether the lane to which the second TX belongs meets the first data transmission condition.

If it is determined that the lane to which the second TX belongs meets the first data transmission condition, processing in the step 414 continues to be performed.

If it is determined that the lane to which the second TX belongs does not meet the first data transmission condition, the step 408 is performed, to continue to adjust the equalization parameter of the second TX.

Refer to FIG. 10A and FIG. 10B. In an implementation, after receiving the second data stream, the first device 210 may further perform the following step 413 to perform equalization adjustment on the RX that is on the first data interface 212 and that corresponds to the second TX.

Step 413: The first device 210 performs, based on the second data stream, adaptive equalization adjustment on the RX receiving the second data stream on the first data interface 212.

In addition, it should be further noted that the step 413 may be performed before the step 412, or may be performed after the step 412. This is not limited in this embodiment of this application.

Step 414: The first device 210 sends an equalization adjustment completion message to a corresponding RX on the second data interface 222 through the first TX on the first data interface 212.

The equalization adjustment message indicates that the lane to which the second TX belongs already meet the first data transmission condition, that is, the equalization parameter of the second TX have been adjusted.

During implementation, when determining that the lane to which the second TX belongs meets the first data transmission condition, the first device 210 sends the equalization adjustment completion message to the corresponding RX on the second data interface 222 through the first TX.

Step 415: The second device 220 obtains a current equalization parameter of the second TX and a current equalization parameter of a first RX. Equalization parameters of the TXs on the second data interface 222 are configured to the current equalization parameter of the second TX. Equalization parameters of the RXs on the second data interface are configured to the current equalization parameter of the first RX.

The first RX and the first TX belong to a same lane, that is, the first RX is an RX that corresponds to the first TX and that is on the second data interface 222.

During implementation, after receiving the equalization adjustment completion message sent by the first device, the second device 220 obtains the current equalization parameter of the second TX and the current equalization parameter of the first RX. Equalization parameters of the TXs on the second data interface 222 are configured to the current equalization parameter of the second TX. Equalization parameters of the RXs on the second data interface are configured to the current equalization parameter of the first RX.

Step 416: The first device 410 obtains a current equalization parameter of the first TX and a current equalization parameter of a second RX. Equalization parameters of the TXs on the first data interface are configured to the current equalization parameter of the first TX. Equalization parameters of the RXs on the first data interface 212 are configured to the current equalization parameter of the second RX.

The second RX and the second TX belong to a same lane, that is, the second RX is an RX that is on the first data interface 212 and that corresponds to the second TX.

During implementation, after sending the equalization adjustment completion message, the first device 410 obtains a current equalization parameter of the first TX and a current equalization parameter of the second RX. Equalization parameters of the TXs on the first data interface are configured to the current equalization parameter of the first TX. Equalization parameters of the RXs on the first data interface 212 are configured to the current equalization parameter of the second RX.

In addition, it should be further noted that, processing of the second device 220 in the step 408 to the step 414 is the same as or similar to processing of the first device 210 in the step 401 to the step 407, and processing of the first device 210 in the step 408 to the step 414 is the same as or similar to processing of the second device 220 in the step 401 to the step 407. Details are not described herein again.

In an implementation, the foregoing pre-adjustment processing may be further performed before step 401.

Figure 11:
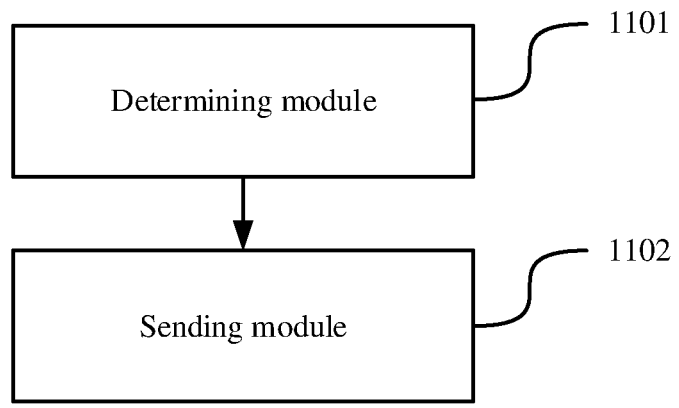
FIG. 11 is a diagram of a structure of a data interface equalization adjustment apparatus according to an embodiment of this application.

Based on a same technical concept, an embodiment of this application further provides a data interface equalization adjustment apparatus. As shown in FIG. 11, the apparatus includes a determining module 1101 and a sending module 1102.

The determining module 1101 is configured to determine equalization parameter indication information of a first TX on a first data interface of a first device.

The sending module 1102 is configured to send a first ETSB to a corresponding RX on the first data interface through a TX on a second data interface. The first ETSB carries the equalization parameter indication information and equalization target indication information. The equalization target indication information indicates that the first TX is an equalization target. The equalization parameter indication information indicates the first device to adjust an equalization parameter of the first TX to an equalization parameter indicated by the equalization parameter indication information.

In an implementation, the apparatus further includes:
a receiving module, configured to receive a target data stream sent by the first device through a TX on the first data interface.

The determining module 1101 is further configured to perform the determining equalization parameter indication information of a first TX on a first data interface of a first device when determining, based on the target data stream, that a lane to which the first TX belongs does not meet a first data transmission condition.

In an implementation, the determining module 1101 is configured to:
determine, based on the target data stream, a bit error rate of the lane to which the first TX belongs, and perform that the second device determines first equalization parameter indication information of a first TX on a first data interface when determining that the bit error rate of the lane to which the first TX belongs is greater than a first threshold.

In an implementation, the determining module 1101 is configured to:
obtain a to-be-used equalization parameter of the first TX from a stored first equalization parameter set; and
determine the equalization parameter indication information corresponding to the to-be-used equalization parameter of the first TX.

In an implementation, the sending module 1102 is configured to:
split the first ETSB into a plurality of first data segments, where a quantity of first data segments obtained through splitting is the same as a quantity of TXs on the second data interface; and
send one first data segment in the plurality of first data segments to a corresponding RX on the first data interface through each TX on the second data interface according to an arrangement sequence of the TXs on the second data interface.

In an implementation, the apparatus further includes:
an adjustment module, configured to perform, based on the target data stream, adaptive equalization adjustment on the RX receiving the target data stream.

In an implementation, the sending module is further configured to:
send a second ETSB to an RX on the first data interface through a TX on the second data interface. The second ETSB indicates the first device to obtain a to-be-used equalization parameter for each target RX receiving the second ETSB from a stored second equalization parameter set, and adjust an equalization parameter of the target RX to the to-be-used equalization parameter of the target RX when determining that a lane to which the target RX belongs does not meet a second data transmission condition.

In an implementation, equalization target indication information is an identifier of the lane to which the first TX belongs.

In the technical solution provided in this embodiment of this application, a local device determines equalization parameters of TXs of a peer device, and sends the equalization parameters to the peer device based on an ETSB. In addition to the equalization parameter indication information, the ETSB further carries the equalization target indication information. After receiving the ETSB, the peer device may use the TX indicated by the equalization target indication information as the equalization target, and then adjust the equalization parameter of the TX to the equalization parameter indicated by the equalization parameter indication information carried in the ETSB. Therefore, the technical solution provided in this embodiment of this application can implement equalization adjustment on a data interface having different quantities of TXs and RXs, and has better universal applicability.

Figure 12:
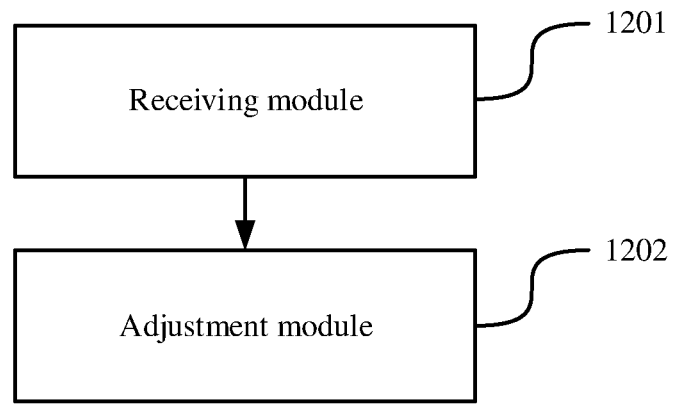
FIG. 12 is a diagram of a structure of a data interface equalization adjustment apparatus according to an embodiment of this application.

Based on a same technical concept, an embodiment of this application further provides a data interface equalization adjustment apparatus. As shown in FIG. 12, the apparatus includes a receiving module 1201 and an adjustment module 1202.

The receiving module 1201 is configured to receive a first ETSB sent by a second device through a TX on a second data interface. The first ETSB carries equalization parameter indication information and equalization target indication information.

The adjustment module 1202 is configured to: determine an equalization target to be the first TX based on the equalization target indication information, and adjust an equalization parameter of a first TX to an equalization parameter indicated by the equalization parameter indication information.

In an implementation, the apparatus further includes:
a sending module, configured to send a target data stream to a corresponding RX on the second data interface through a TX on the first data interface.

In an implementation, the receiving module 1201 is further configured to receive a second ETSB sent by the second device through a TX on the second data interface.

The adjustment module 1202 is further configured to: obtain a to-be-used equalization parameter for each target RX receiving the second ETSB from a stored second equalization parameter set, and adjust an equalization parameter of the target RX to the to-be-used equalization parameter of the target RX when determining that a lane to which the target RX belongs does not meet a second data transmission condition.

In an implementation, equalization target indication information is an identifier of the lane to which the first TX belongs.

In the technical solution provided in this embodiment of this application, a local device receives an ETSB sent by a peer device, and includes equalization parameter indication information and equalization target indication information in the ETSB. After receiving the ETSB, the local device may use the TX indicated by the equalization target indication information as the equalization target, and then adjust the equalization parameter of the TX to the equalization parameter indicated by the equalization parameter indication information carried in the ETSB. Therefore, the technical solution provided in this embodiment of this application can implement equalization adjustment on a data interface having different quantities of TXs and RXs, and has better universal applicability.

Based on a same technical concept, the data interface equalization adjustment apparatus shown in FIG. 11 provided in this embodiment of this application may further perform the following processing.

The determining module 1101 is configured to determine equalization parameter indication information to which TXs on a first data interface of a first device jointly correspond.

The sending module 1102 is configured to send a first ETSB to an RX on the first data interface through a TX on a second data interface. The first ETSB carries the equalization parameter indication information. The equalization parameter indication information indicates the first device to adjust equalization parameters of the TXs on the first data interface to an equalization parameter indicated by the equalization parameter indication information.

In an implementation, the apparatus further includes:
a receiving module, configured to receive a target data stream sent by the first device through a TX on the first data interface.

The determining module 1101 is further configured to perform the determining equalization parameter indication information to which TXs on a first data interface of a first device jointly correspond when determining, based on the target data stream, that there is a lane that is in lanes to which RXs on the second data interface belong and that does not meet a first data transmission condition.

In an implementation, the determining module 1101 is configured to:
determine, based on the target data stream, bit error rates of the lanes to which the RXs on the second data interface belong, and perform that the second device determines first equalization parameter indication information to which TXs on a first data interface jointly correspond when there is a bit error rate that is in the bit error rates of the lanes to which the RXs belong and that is greater than a first threshold.

In an implementation, the determining module 1101 is configured to:
obtain a to-be-used equalization parameter to which the TXs on the first data interface of the first device jointly correspond from a stored first equalization parameter set; and determine the equalization parameter indication information corresponding to the to-be-used equalization parameter.

In the technical solution provided in this embodiment of this application, a local device may determine an equalization parameter to which TXs on a data interface of a peer device jointly correspond, include equalization parameter indication information corresponding to the equalization parameter to the ETSB, and send the equalization parameter indication information to the peer device. After receiving the ETSB, the peer device adjusts equalization parameters of the TXs on the data interface to the equalization parameter indicated by the equalization parameter indication information carried in the ETSB. Therefore, the technical solution provided in this embodiment of this application can implement equalization adjustment on a data interface having different quantities of TXs and RXs, and has better universal applicability.

Based on a same technical concept, the data interface equalization adjustment apparatus shown in FIG. 12 provided in this embodiment of this application may further perform the following processing.

The receiving module 1201 is configured to receive a first ETSB sent by a second device through a TX on a second data interface. The first ETSB carries equalization parameter indication information.

The adjustment module 1202 is configured to adjust equalization parameters of TXs on a first data interface to an equalization parameter indicated by the equalization parameter indication information.

In the technical solution provided in this embodiment of this application, a local device receives an ETSB sent by a peer device, and obtains equalization parameter indication information carried in the ETSB. Then, equalization parameters of TXs on a data interface of the local device to an equalization parameter indicated by the equalization parameter indication information. Therefore, the technical solution provided in this embodiment of this application can implement equalization adjustment on a data interface having different quantities of TXs and RXs, and has better universal applicability.

Based on a same technical concept, the data interface equalization adjustment apparatus shown in FIG. 11 provided in this embodiment of this application may further perform the following processing.

The determining module 1101 is configured to determine equalization parameter indication information of a first TX on a first data interface of a first device.

The sending module 1102 is configured to send a first ETSB to a corresponding RX on the first data interface through a second TX on a second data interface. The first ETSB carries the equalization parameter indication information. The equalization parameter indication information indicates the first device to adjust an equalization parameter of the first TX to an equalization parameter indicated by the equalization parameter indication information, and to configure equalization parameters of TXs on the first data interface to a current equalization parameter of the first TX when determining that a lane to which the first TX belongs meets a first data transmission condition.

In an implementation, the apparatus further includes:
The receiving module is configured to receive a target data stream sent by the first device to a corresponding RX on the second data interface through the first TX.

The sending module 1102 is further configured to send an equalization completion message to the first device when determining, based on the target data stream, that the lane to which the first TX belongs meets the first data transmission condition.

In an implementation, the determining module 1101 is further configured to:

perform that a second device determines equalization parameter indication information of a first TX on a first data interface when determining, based on the target data stream, that the lane to which the first TX belongs does not meet the first data transmission condition.

In an implementation, the sending module 1102 is configured to:

determine, based on the target data stream, a bit error rate of the lane to which the first TX belongs, and send the equalization completion message to the first device when determining that the bit error rate of the lane to which the first TX belongs is less than a first threshold.

The determining module 1101 is configured to:

determine, based on the target data stream, a bit error rate of the lane to which the first TX belongs, and perform that the second device determines the equalization parameter indication information of the first TX on the first data interface when determining that the bit error rate of the lane to which the first TX belongs is greater than the first threshold.

In the technical solution provided in this embodiment of this application, a local device determines an equalization parameter of a first TX specified on a data interface of a peer device, includes equalization parameter indication information corresponding to the equalization parameter in an ETSB, and sends the equalization parameter indication information to the peer device. After receiving the ETSB, the peer device adjusts an equalization parameter of the first TX on the data interface to the equalization parameter indicated by the equalization parameter indication information carried in the ETSB. After the equalization parameter of the first TX is adjusted, a lane to which the first TX belongs meets a data transmission condition. In this case, the peer device obtains a current equalization parameter of the first TX, and adjusts equalization parameters of TXs on the data interface to the current equalization parameter of the first TX. Therefore, the technical solution provided in this embodiment of this application can implement equalization adjustment on a data interface having different quantities of TXs and RXs, and has better universal applicability.

Based on a same technical concept, the data interface equalization adjustment apparatus shown in FIG. 12 provided in this embodiment of this application may further perform the following processing.

The receiving module 1201 is configured to receive a first ETSB sent by a second device through a second TX on a second data interface. The first ETSB carries equalization parameter indication information.

The adjustment module 1202 is configured to: adjust an equalization parameter of a first TX to an equalization parameter indicated by the equalization parameter indication information, and configure equalization parameters of TXs on a first data interface to a current equalization parameter of the first TX when determining that a lane to which the first TX belongs meets a first data transmission condition.

In the technical solution provided in this embodiment of this application, after receiving the ETSB sent by the peer device, the local device adjusts the equalization parameter of the specified first TX to the equalization parameter indicated by the equalization parameter indication information carried in the ETSB. After the equalization parameter of the first TX is adjusted, a lane to which the first TX belongs meets a data transmission condition. In this case, the peer device obtains a current equalization parameter of the first TX, and adjusts equalization parameters of TXs on the data interface to the current equalization parameter of the first TX. Therefore, the technical solution provided in this embodiment of this application can implement equalization adjustment on a data interface having different quantities of TXs and RXs, and has better universal applicability.

It should be noted that protection solutions of the data interface equalization adjustment apparatus according to the foregoing embodiments are determined merely by using division of the foregoing functional modules as an example. In an actual application, the foregoing functions can be allocated to different functional modules according to requirements. An internal structure of a device is divided into different functional modules to implement all or some of the functions described above. In addition, the data interface equalization adjustment apparatus provided in the foregoing embodiments and the data interface equalization adjustment method embodiments belong to a same concept. For an implementation process, refer to the method embodiments. Details are not described herein again.

Figure 13:
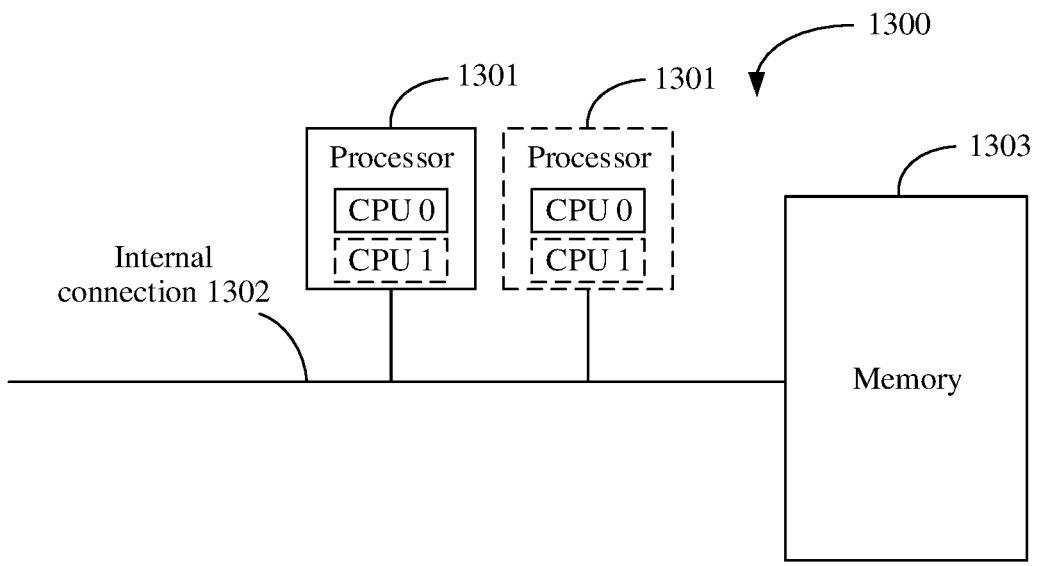
FIG. 13 is a diagram of a structure of a device according to an embodiment of this application.

FIG. 13 is a diagram of a device 1300 according to an embodiment of this application. The device 1300 may be a computer, a server, or the like. The device 1300 includes at least one processor 1301, an internal connection 1302, and a memory 1303.

The device 1300 is an apparatus of a hardware structure, and may be configured to implement functional modules in the apparatus shown in FIG. 6. For example, a person skilled in the art may figure out that the determining module 1101 in the apparatus shown in FIG. 11 may be implemented by the at least one processor 1301 by invoking code in the memory 1303, and the adjustment module 1202 in the apparatus shown in FIG. 12 may also be implemented by the at least one processor 1301 by invoking code in the memory 1303.

Optionally, the processor 1301 may be a general-purpose central processing unit (CPU), a network processor (NP), a microprocessor, an application-specific integrated circuit (ASIC), or one or more integrated circuits configured to control program execution of the solutions of this application.

The internal connection 1302 may include a lane for transmitting information between the foregoing components. Optionally, the internal connection 1302 is a board, a bus, or the like.

The memory 1303 may be a read-only memory (ROM) or another type of static storage device that can store static information and instructions, or a random access memory (RAM) or another type of dynamic storage device that can store information and instructions. The memory 1303 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory 1303 is not limited thereto. The memory may exist independently, and is connected to the processor through the bus. The memory may alternatively be integrated with the processor.

The memory 1303 is configured to store application program code for executing the solutions in this application, and the processor 1301 controls the execution. The processor 1301 is configured to execute the application program code stored in the memory 1303, so that the device 1300 implements functions in this application.

In an implementation, in an embodiment, the processor 1301 may include one or more CPUs, for example, a CPU 0 and a CPU 1 in FIG. 13.

In an implementation, in an embodiment, the device 1300 may include a plurality of processors. Each of the processors may be a single-core processor, or may be a multi-core processor. The processor herein may be one or more devices, circuits, and/or processing cores configured to process data (for example, computer program instructions).

An embodiment of this application further provides a computer-readable storage medium. The computer-readable storage medium stores instructions or a program, and the instructions or the program are or is loaded and executed by a processor, to implement the data interface equalization adjustment method provided in embodiments of this application.

An embodiment of this application further provides a computer program product. The computer program product includes instructions, and the instructions are loaded and executed by a processor, to implement the data interface equalization adjustment method provided in embodiments of this application.

An embodiment of this application further provides a chip system. The chip system includes at least one processor, configured to support implementation of functions in the data interface equalization adjustment method provided in embodiments of this application, for example, processing an ETSB and a data stream in the foregoing method.

In an design, the chip system further includes a memory. The memory is configured to store program instructions and data. The memory is located inside the processor or outside the processor. The chip system may include a chip, or may include a chip and another discrete component.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a device, all or some of the procedures or functions are generated according to embodiments of this application. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a device, or a data storage device, such as a server or a data center, integrating one or more usable media. The usable media may be a magnetic medium (for example, a floppy disk, a hard disk drive, or a magnetic tape), an optical medium (for example, a digital video disk (DVD)), or a semiconductor medium (for example, a solid-state drive).

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are embodiments of this application, but are not intended to limit this application. Any modification, equivalent replacement, improvement, or the like made without departing from the principle of this application should fall within the protection scope of this application.

What is claimed is:

1. A data interface equalization adjustment method for a communication system, the data interface equalization adjustment method comprising:

determining, by a second device, equalization parameter indication information of a first transmitter (TX) on a first data interface, the communication system comprising a first device and the second device, the first device comprising the first data interface, the second device comprising a second data interface, the first data interface and the second data interface being connected over a link;

sending, by the second device, a first equalization training sequence block (ETSB) to a corresponding receiver (RX) on the first data interface through a TX on the second data interface, the first ETSB carrying the equalization parameter indication information and equalization target indication information, the equalization target indication information indicates that the first TX is an equalization target; and determining, by the first device, the equalization target to be the first TX based on the equalization target indication information; and adjusting an equalization parameter of the first TX to an equalization parameter indicated by the equalization parameter indication information.

2. The method according to claim 1, wherein after the determining, by the first device, the equalization target to be the first TX based on the equalization target indication information, the method further comprises:

sending, by the first device, a target data stream to a corresponding RX on the second data interface through a TX on the first data interface; and performing, by the second device, the determining, by the second device, the equalization parameter indication information of the first TX on the first data interface when determining, based on the target data stream, that a lane to which the first TX belongs does not meet a first data transmission condition.

3. The method according to claim 2, wherein the determining, by the second device, the equalization parameter indication information of a first TX on the first data interface when determining, based on the target data stream, that the lane to which the first TX belongs does not meet the first data transmission condition comprises:

determining, by the second device based on the target data stream, a bit error rate of the lane to which the first TX belongs, and performing the determining, by the second device, the equalization parameter indication information of the first TX on the first data interface when determining that the bit error rate of the lane to which the first TX belongs is greater than a first threshold.

4. The method according to claim 2, wherein after the sending, by the first device, a target data stream to the RX on the second data interface through the TX on the first data interface, the method comprises:

performing, by the second device based on the target data stream, adaptive equalization adjustment on the RX receiving the target data stream.

5. The method according to claim 1, wherein the determining, by the second device, the equalization parameter indication information of the first TX on the first data interface comprises:
obtaining, by the second device, a to-be-used equalization parameter of the first TX from a stored first equalization parameter set; and
determining the equalization parameter indication information corresponding to the to-be-used equalization parameter of the first TX.

6. The method according to claim 1, wherein the sending, by the second device, the first ETSB to the corresponding RX on the first data interface through the TX on the second data interface comprises:
splitting, by the second device, the first ETSB into a plurality of first data segments, wherein a quantity of first data segments obtained through the splitting is the same as a quantity of TXs on the second data interface; and
sending, by the second device, one first data segment in the plurality of first data segments to a corresponding RX on the first data interface through each TX on the second data interface according to an arrangement sequence of the TXs on the second data interface.

7. The method according to claim 6, wherein before the performing, by the first device, equalization adjustment on a TX indicated by first equalization target indication information based on first equalization parameter indication information, the method further comprises:
concatenating, by the first device according to an arrangement sequence of RXs on the first data interface, the plurality of first data segments received, to obtain the first ETSB.

8. The method according to claim 1, wherein the method further comprises:
sending, by the second device, a second ETSB to the RX on the first data interface through the TX on the second data interface; and
obtaining, by the first device, a to-be-used equalization parameter for each target RX receiving the second ETSB from a stored second equalization parameter set, and adjusting an equalization parameter of the target RX to the to-be-used equalization parameter of the target RX when determining that a lane to which the target RX belongs does not meet a second data transmission condition.

9. The method according to claim 8, wherein the sending, by the second device, the second ETSB to the RX on the first data interface through the TX on the second data interface comprises:
splitting, by the second device, the second ETSB into a plurality of second data segments, wherein a quantity of second data segments obtained through the splitting is the same as a quantity of the TXs on the second data interface; and
sending, by the second device, one second data segment in the plurality of second data segments to a corresponding RX on the first data interface through each TX on the second data interface according to the arrangement sequence of the TXs on the second data interface.

10. The method according to claim 9, wherein the obtaining, by the first device, the to-be-used equalization parameter for the each target RX receiving the second ETSB from the stored second equalization parameter set, and adjusting the equalization parameter of the target RX to the to-be-used equalization parameter of the target RX when determining that the lane to which the target RX belongs does not meet the second data transmission condition comprises:
obtaining, by the first device, the to-be-used equalization parameter for the each target RX receiving the second data segment from the stored second equalization parameter set, and adjusting the equalization parameter of the target RX to the to-be-used equalization parameter of the target RX when determining that the lane to which the target RX belongs does not meet the second data transmission condition.

11. The method according to claim 10, wherein the obtaining, by the first device, the to-be-used equalization parameter of the target RX from the stored second equalization parameter set, and the adjusting the equalization parameter of the target RX to the to-be-used equalization parameter of the target RX when determining that the lane to which the target RX belongs does not meet the second data transmission condition comprises:
determining, by the first device, a bit error rate of the lane to which the target RX belongs based on the second data segment received by the target RX, obtaining the to-be-used equalization parameter of the target RX from the stored second equalization parameter set, and adjusting the equalization parameter of the target RX to the to-be-used equalization parameter of the target RX when determining the bit error rate of the lane to which the target RX belongs to be greater than a second threshold.

12. The method according to claim 1, wherein the equalization target indication information is an identifier of the lane to which the first TX belongs.

13. A data interface equalization adjustment method, comprising:
determining equalization parameter indication information of a first transmitter (TX) on a first data interface of a first device; and
sending a first equalization training sequence block (ETSB) to a corresponding receiver (RX) on the first data interface through a TX on a second data interface, the first ETSB carrying the equalization parameter indication information and equalization target indication information, the equalization target indication information indicates that the first TX is an equalization target, and the equalization parameter indication information indicates the first device adjust an equalization parameter of the first TX to an equalization parameter indicated by the equalization parameter indication information.

14. The method according to claim 13, wherein the method further comprises:
receiving a target data stream sent by the first device through a TX on the first data interface; and
performing the determining equalization parameter indication information of the first TX on the first data interface of the first device when determining, based on the target data stream, that a lane to which the first TX belongs does not meet a first data transmission condition.

15. The method according to claim 14, wherein the performing the determining the equalization parameter indication information of a first TX on a first data interface of a first device when determining, based on the target data stream, that the lane to which the first TX belongs does not meet the first data transmission condition comprises:

determining, based on the target data stream, a bit error rate of the lane to which the first TX belongs, and performing the determining, by the second device, the equalization parameter indication information of the first TX on a first data interface when determining that the bit error rate of the lane to which the first TX belongs is greater than a first threshold.

16. The method according to claim 14, wherein after the receiving a target data stream sent by the first device through the TX on the first data interface, the method further comprises:
performing, based on the target data stream, adaptive equalization adjustment on the RX receiving the target data stream.

17. The method according to claim 13, wherein the determining the equalization parameter indication information of the first TX on the first data interface comprises:
obtaining a to-be-used equalization parameter of the first TX from a stored first equalization parameter set; and
determining the equalization parameter indication information corresponding to the to-be-used equalization parameter of the first TX.

18. The method according to claim 13, wherein the sending the first ETSB to the corresponding RX on the first data interface through the TX on a second data interface comprises:
splitting the first ETSB into a plurality of first data segments, wherein a quantity of first data segments obtained through the splitting is the same as a quantity of TXs on the second data interface; and
sending one first data segment in the plurality of first data segments to a corresponding RX on the first data interface through each TX on the second data interface according to an arrangement sequence of the TXs on the second data interface.

19. The method according to claim 13, wherein the method further comprises:
sending a second ETSB to the RX on the first data interface through the TX on the second data interface, wherein the second ETSB indicates the first device obtain a to-be-used equalization parameter for each target RX receiving the second ETSB from a stored second equalization parameter set, and adjust an equalization parameter of the target RX to the to-be-used equalization parameter of the target RX when determining that a lane to which the target RX belongs does not meet a second data transmission condition.

20. An apparatus, comprising:
at least one processor; and
a plurality of calculation circuits, a model comprising a plurality of operators, the plurality of operators run on the plurality of calculation circuits, and the plurality of calculation circuits correspond to different data formats; and
the at least one processor is configured to:
determine equalization parameter indication information of a first TX on a first data interface of a first device; and
send a first ETSB to a corresponding RX on the first data interface through a TX on a second data interface, the first ETSB carrying the equalization parameter indication information and equalization target indication information, the equalization target indication information indicating the first TX is an equalization target, and the equalization parameter indication information indicating the first device adjust an equalization parameter of the first TX to an equalization parameter indicated by the equalization parameter indication information.

* * * * *